United States Patent
Kobayashi et al.

(10) Patent No.: US 8,504,768 B2
(45) Date of Patent: Aug. 6, 2013

(54) STORAGE APPARATUS, RECORDING MEDIUM AND METHOD FOR CONTROLLING STORAGE APPARATUS

(75) Inventors: Kenji Kobayashi, Kawasaki (JP); Hideo Takahashi, Kawasaki (JP); Norihide Kubota, Kawasaki (JP); Atsushi Igashira, Kawasaki (JP); Hidejirou Daikokuya, Kawasaki (JP); Kazuhiko Ikeuchi, Kawasaki (JP); Chikashi Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 247 days.

(21) Appl. No.: 13/073,409

(22) Filed: Mar. 28, 2011

(65) Prior Publication Data

US 2011/0246717 A1  Oct. 6, 2011

(30) Foreign Application Priority Data

Mar. 31, 2010  (JP) .................................. 2010-080272

(51) Int. Cl.
    *G06F 12/00*  (2006.01)
(52) U.S. Cl.
    USPC .......................................... 711/114

(58) Field of Classification Search
    None
    See application file for complete search history.

(56) References Cited

U.S. PATENT DOCUMENTS

| | | |
|---|---|---|
| 2003/0018851 A1 | 1/2003 | Ikeuchi et al. |
| 2003/0018864 A1 | 1/2003 | Ikeuchi et al. |
| 2003/0120674 A1 | 6/2003 | Morita et al. |

FOREIGN PATENT DOCUMENTS

| | | |
|---|---|---|
| JP | 2003-29933 | 1/2003 |
| JP | 2003-29934 | 1/2003 |
| JP | 2003-241904 | 8/2003 |

*Primary Examiner* — Duc Doan
(74) *Attorney, Agent, or Firm* — Staas & Halsey LLP

(57) ABSTRACT

A storage apparatus has a plurality of storage media including each storage area in which a stripe is set extending over the storage area of the plurality of storage media. An access unit that writes a format data into the storage area, wherein when the plurality of storage media are formatted, the access unit writes an unformatted-state identifier indicating incompletion of formatting into at least a portion of storage area to be included in the stripe, or when the storage area to be included in the stripe is accessed for writing new data, the access unit reads out existing data stored in the storage area included in the stripe to be accessed. And when the unformatted-state identifier is detected from the existing data that has been read out, the access unit writes the new data or the format data to be written by formatting into the storage area.

10 Claims, 23 Drawing Sheets

STORAGE APPARATUS, RECORDING MEDIUM AND METHOD FOR CONTROLLING STORAGE APPARATUS

CROSS-REFERENCE TO RELATED APPLICATION

This application is based upon and claims the benefit of priority of the prior Japanese Patent Application No. 2010-080272, filed on Mar. 31, 2010, the entire contents of which are incorporated herein by reference.

FIELD

The present invention relates to a storage apparatus, a recording medium and a method for controlling the storage apparatus.

BACKGROUND

In storage apparatuses using storage media such as magnetic disks, optical magnetic disks, optical disks, and the like, format processing operations that preliminarily initialize storage media are necessary for utilizing the storage media for reading and writing data. Examples of the format processing operations include physical formatting in which a digital signal sequence in a storage medium is rewritten with a specified pattern so that the storage medium can be read and written by a storage apparatus, and logical formatting in which a data area is partitioned in units of processing performed by a host OS (for example, in units of blocks) and identified.

The physical formatting is an initializing process in which a medium is formatted in units of tracks, and the logical format means a formatting process in which a data area in a physically formatted track is formatted in units of blocks. In the logical format, usually, it takes a long time (for example, more than or equal to 30 minutes) to complete the formatting process with respect to all blocks in the medium. Therefore, when a storage medium is used, it is necessary to wait for a long time for the completion of formatting performed in the formatting process preliminarily carried out as an initializing process.

On the other hand, for example, there has been a technique where, when an access request made by a host computer or the like is a request directed to an area in which formatting is not completed, logical formatting is executed for the area first, and then the access the request of which is accepted is performed, thereby enabling the access request from the host computer or the like to be accepted even if a storage medium is, after being connected, in a state in which logical formatting is not completed. Accordingly, the host computer can make an access request to the connected storage medium before the completion of the logical formatting. Example of documents of the related art include Japanese Laid-open Patent Publication No. 2003-29933, Japanese Laid-open Patent Publication No. 2003-29934, and Japanese Laid-open Patent Publication No. 2003-241904. However, in the above-mentioned techniques, there is a problem that, when a host computer makes an access request, logical formatting and an access operation are sequentially performed, and hence the load of processing performed in a storage apparatus and a load on a storage medium become large owing to the increase of the number of times the storage medium is accessed. In addition, when an access request directed to an storage area the formatting of which is not completed is accepted from the host computer, a processing operation or the like for evacuating data for the access request is added compared with a processing operation for a normal access request, and hence a time necessary for the processing of the access request increases, thereby the processing of the access request being delayed. Therefore, it is desirable to transfer, as quickly as possible, the storage medium to a state in which format processing is completed.

SUMMARY

An object of the present invention is to provide a storage technique in which, in an access to a storage medium the logical formatting of which is uncompleted, the increase of the load of the storage medium can be restrained and the duration of time before completing the formatting of the storage medium can be reduced.

According to an embodiment for accomplishing the above-mentioned object, a storage apparatus has a plurality of storage media including each storage area in which a stripe is set extending over the storage area of the plurality of storage media. An access unit that writes a format data into the storage area, wherein when the plurality of storage media are formatted, the access unit writes an unformatted-state identifier indicating incompletion of formatting into at least a portion of storage area to be included in the stripe, or when the storage area to be included in the stripe is accessed for writing new data, the access unit reads out existing data stored in the storage area included in the stripe to be accessed. And when the unformatted-state identifier is detected from the existing data that has been read out, the access unit writes the new data or the format data to be written by formatting into the storage area.

a storage apparatus has a storage area configured by a stripe among a plurality of storage media and an access unit that writes a format data into the storage area; wherein when the plurality of storage media are formatted, the access unit writes an unformatted-state identifier indicating incompletion of formatting into at least a portion of storage area to be included in the stripe, when the storage area is accessed for writing new data, the access unit reads out existing data stored in the storage area included in the stripe to be accessed, and when the unformatted-state identifier is detected from the existing data that has been read out, the access unit writes the new data or the format data to be written by formatting into the storage area.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Hereinafter, embodiments will be described with reference to figures.

[a] First Embodiment

Figure 1:
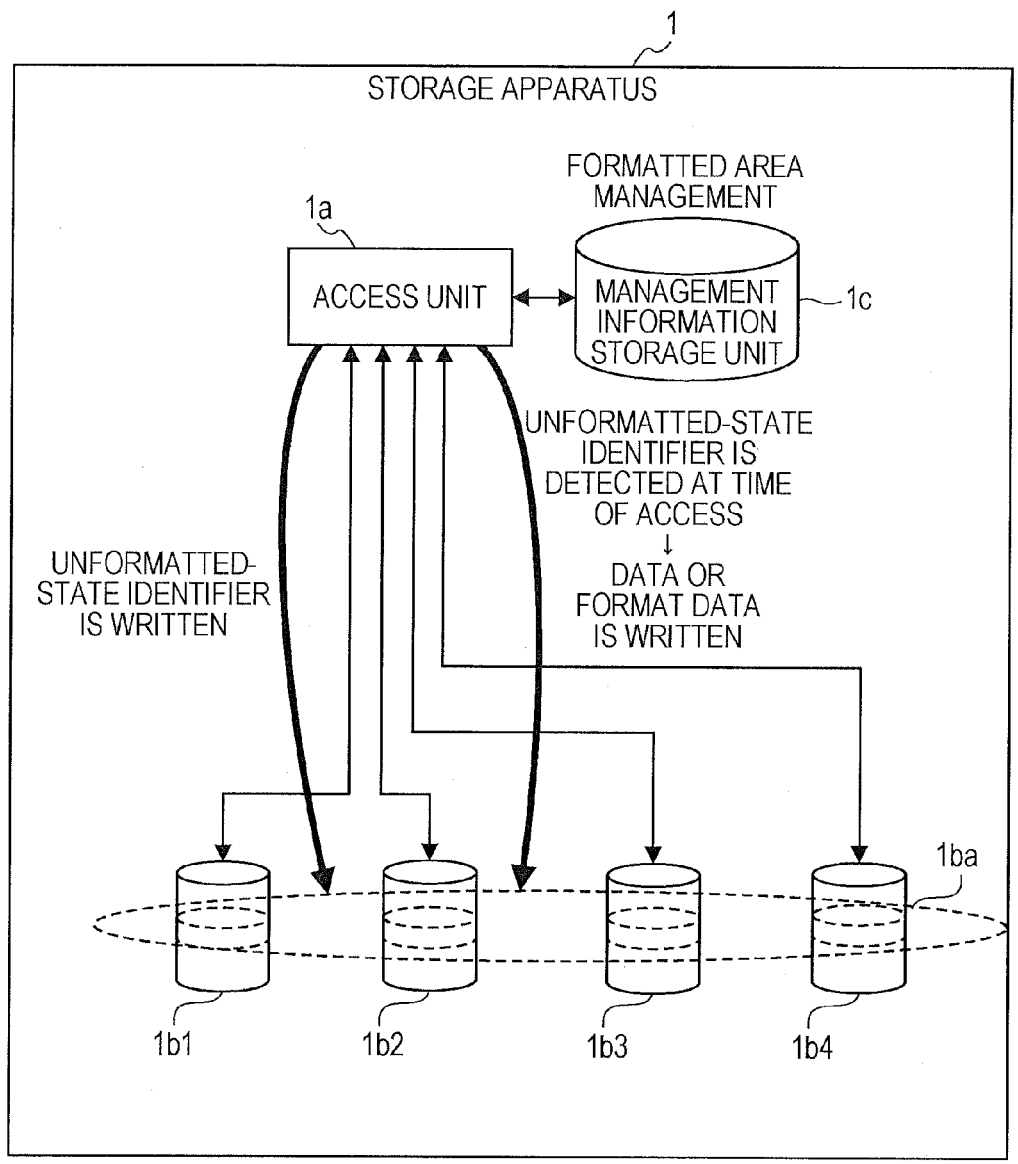
FIG. 1 is a diagram illustrating a storage apparatus according to a first embodiment.

FIG. 1 is a diagram illustrating a storage apparatus according to a first embodiment. A storage apparatus 1 according to the present embodiment includes an access unit 1a, storage media 1b1, 1b2, 1b3, and 1b4, and a management information storage unit 1c.

The storage media 1b1, 1b2, 1b3, and 1b4 include storage areas in which pieces of data can be stored. In the storage media 1b1, 1b2, 1b3, and 1b4, a stripe is set that includes a portion of a storage area in each of the storage media 1b1, 1b2, 1b3, and 1b4. Pieces of data are stored in units of stripes into storage areas included in the storage media 1b1, 1b2, 1b3, and 1b4, by the access unit 1a.

The management information storage unit 1c stores therein management information indicating whether or not logical formatting has been performed with respect to the storage areas included in the storage media 1b1, 1b2, 1b3, and 1b4. When the storage media 1b1, 1b2, 1b3, and 1b4 are initialized, the access unit 1a writes an unformatted-state identifier indicating the incompletion of formatting into at least a portion of a stripe extending to the storage media 1b1, 1b2, 1b3, and 1b4, and causes the management information storage unit 1c to store management information indicating the completion of formatting with respect to the storage areas included in the stripe into which the unformatted-state identifier has been written.

Here, for example, the unformatted-state identifier may be set as data including a predetermined data structure in which a specific value is set in a predetermined position in the data. The unformatted-state identifier is stored in a stripe extending to the storage media 1b1 to 1b4. While the stripe in which the unformatted-state identifier is stored is treated, from the viewpoint of the management information, as a stripe in which logical formatting has been completed, actually the logical formatting has not been completed.

Next, when a storage area in a stripe is accessed for writing new data thereinto, the access unit 1a reads out existing data stored in the storage area included in the stripe that is an access target.

Next, when the unformatted-state identifier is detected from the existing data read out from the stripe that is an access target, the access unit 1a writes new data or format data to be written by formatting into the stripe that is an access target. Here, the unformatted-state identifier may be detected on the basis of whether or not the read data has a specific value located in a predetermined position.

In addition, while the storage apparatus 1 according to the present embodiment includes four storage media, namely, the storage media 1b1, 1b2, 1b3, and 1b4, the number of storage media may be less than or equal to 3 or greater than or equal to 5.

In this way, in the storage apparatus 1, the access unit 1a writes an unformatted-state identifier into a storage area in a storage medium, included in a portion of a stripe, without formatting the storage medium when the storage medium is initialized, and, after that, when the unformatted-state identifier is detected from the stripe, the access unit 1a writes data, which is a write target, or format data into the stripe. Accordingly, when the storage media 1b1, 1b2, 1b3, and 1b4 that have not been logically formatted by the access unit 1a are accessed, the increase of the loads of the storage media 1b1, 1b2, 1b3, 1b4 can be restrained and the duration of time before completing the formatting of the storage media 1b1, 1b2, 1b3, and 1b4 can be reduced.

[b] Second Embodiment

Next, an embodiment in which the storage apparatus 1 is applied to a storage apparatus 100 including a storage group included in redundant arrays of inexpensive disks (RAID) will be described as a second embodiment.

Figure 2:
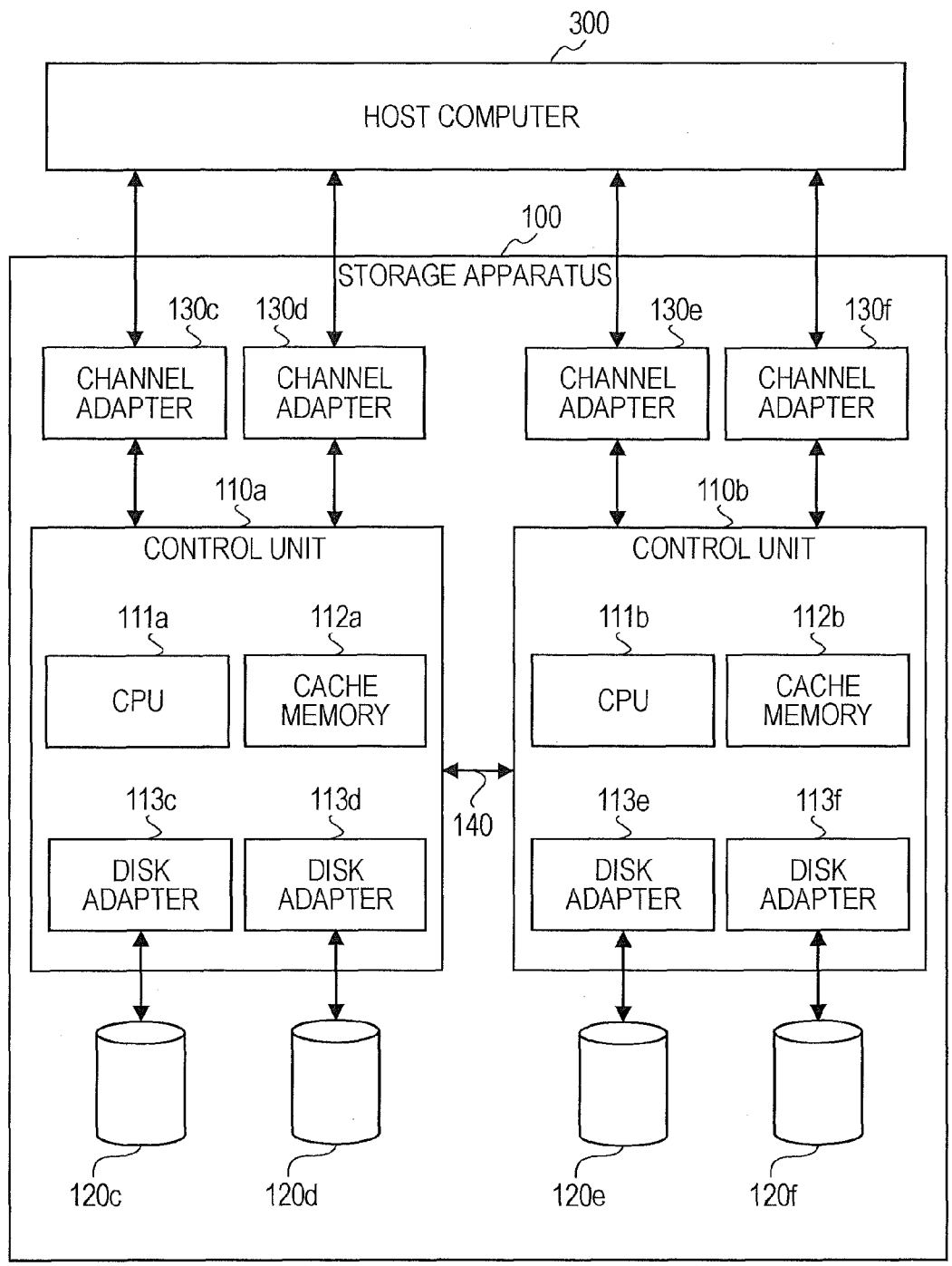
FIG. 2 is a diagram illustrating a hardware configuration of a storage apparatus according to a second embodiment.

FIG. 2 is a diagram illustrating the hardware configuration of a storage apparatus according to the second embodiment. The storage apparatus 100 includes control units 110a and 110b that control the entire device, storage devices 120c to 120f, and channel adapters 130c to 130f that control connections between the control units 110a and 110b and a host computer 300.

The storage apparatus 100 inputs and outputs data from and to the storage devices 120c to 120f. The storage apparatus 100 includes disk array functions such as RAIDs 0 to 6 and the like, and collectively manages a plurality of storage devices as one storage device.

The host computer 300 is a computer executing business processing, and is connected to the storage apparatus 100 through a local area network (LAN) including a fiber channel so that the host computer 300 can establish data communication with the storage apparatus 100. The host computer 300 stores and reads out data used for the business processing in and from the storage apparatus 100.

The control unit 110a includes a central processing unit (CPU) 111a, a cache memory 112a, and disk adapters 113c and 113d. The CPU 111a executes a processing operation in accordance with an operating system (OS) or the like, and performs various kinds of control operations. In addition, the control unit 110a performs resource management for the cache memory 112a, the storage devices 120c and 120d, the channel adapters 130c and 130d, and the like.

The cache memory 112a stores therein control data necessary for the CPU 111a to control the storage apparatus 100. In addition, the cache memory 112a temporarily stores input-output data to be read and written from and into the storage devices 120c and 120d.

The disk adapters 113c and 113d individually control connections established with the corresponding storage devices 120c and 120d. In addition, the control unit 110a and the control unit 110b are connected to each other through a bus 140. Control information and data are communicated between the control unit 110a and the control unit 110b through the bus 140. Here, since the control unit 110b has the same configuration as the control unit 110a, the description thereof will be omitted.

The storage devices 120c to 120f are hard disk drives (HDDs), and store therein the data of a system user and backup data, transmitted from the host computer 300. In addition, the data of a system user and the backup data may not be necessarily stored in one hard disk but may be distributed and stored in a plurality of hard disks. In addition, the data of plural system users and the backup data may be stored in one hard disk. In addition, for example, nonvolatile semiconductor memories such as solid state drives (SSDs) or the like or storage media in which data can be stored may be used as the storage devices 120c to 120f.

The channel adapters 130c to 130f control connections between the host computer 300 and the control units 110a and 110b. For example, the channel adapter 130c controls a connection established with the control unit 110a, in response to the reception of a request from the host computer 300. Each of the control units 110a and 110b can be connected to a plurality of channel adapters (two channel adapters in FIG. 2) among the channel adapters 130c to 130f. Namely, for example, the control unit 110a is connected to both the channel adapters 130c and 130d different from each other so that a redundant configuration is realized.

In addition, while, in the example illustrated in FIG. 2, communication between the channel adapters 130c to 130f and the host computer 300 is established using the LAN including a fiber channel, the communication may be established using a connection method other than the fiber channel. In addition, using a dedicated line or a virtual private network (VPN), the communication between the channel adapters 130c to 130f and the host computer 300 may be configured so that the storage apparatus 100 is situated in a location remote from the host computer 300.

In addition, while, in FIG. 2, the two control units 110a and 110b are illustrated, and two disk adapters from among the disk adapters 113c to 113f and two channel adapters from among the channel adapters 130c to 130f are illustrated with respect to each of the control units 110a and 110b, the numbers of these units are arbitrary.

Figure 3:
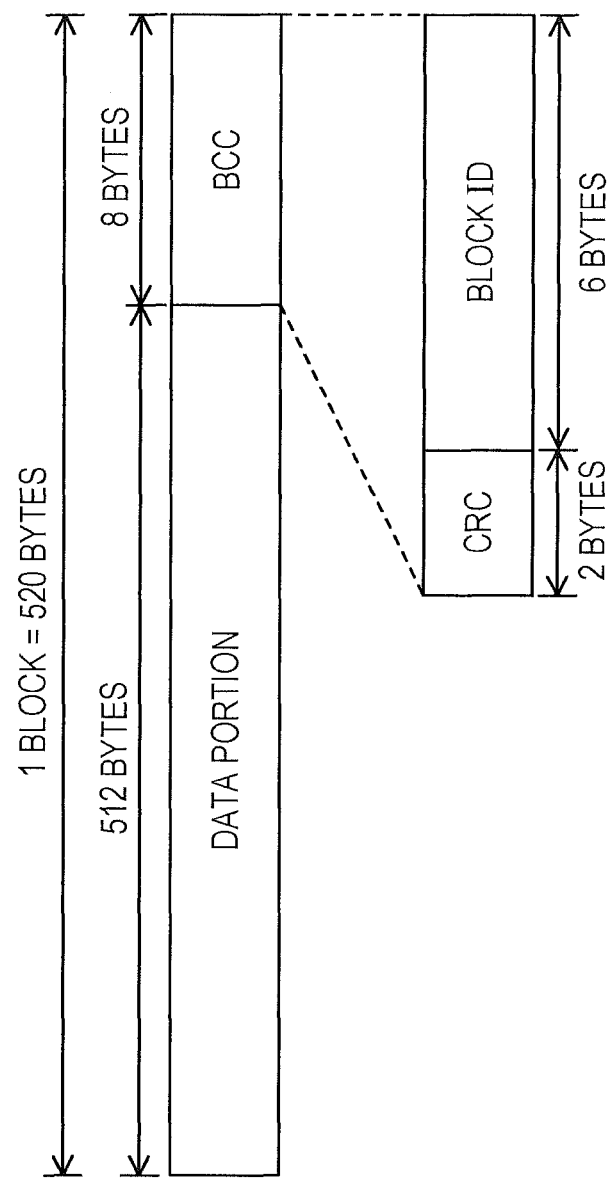
FIG. 3 is a diagram illustrating an example of a data structure of data to be stored in the storage apparatus according to the second embodiment.

In accordance with the above-mentioned hardware configuration, the processing function according to the present embodiment can be realized. FIG. 3 is a diagram illustrating an example of the data structure of data to be stored in the storage apparatus according to the second embodiment. In the present embodiment, data the structure of which is illustrated in FIG. 3 is stored in the storage devices 120c to 120f included in the storage apparatus 100.

In the structure of data illustrated in FIG. 3, 1 block is data having the length of 520 bytes, and a data portion of 512 bytes and a block check code (BCC) of 8 bytes are included. The BCC includes a cyclic redundancy check (CRC) of 2 bytes and a block ID of 6 bytes. Pieces of data are individually stored, in units of blocks, in storage areas in storage devices different from one another, in a stripe extending to the storage devices 120c to 120f.

The data portion is a data body to be stored in the storage apparatus 100, and is obtained by dividing data transmitted from the host computer 300 into blocks each of which has a predetermined length (for example, 520 bytes).

The BCC is a code used for confirming the consistency of the data portion. The CRC is a redundancy code used for detecting an error that occurs in the data portion, and is generated from the value of the data portion, using a predetermined function. In addition, the block ID is information used for detecting the malfunction of the position of a storage area in which data portion is stored in the storage apparatus 100, and is a value specific to the corresponding block of the data.

Figure 4:
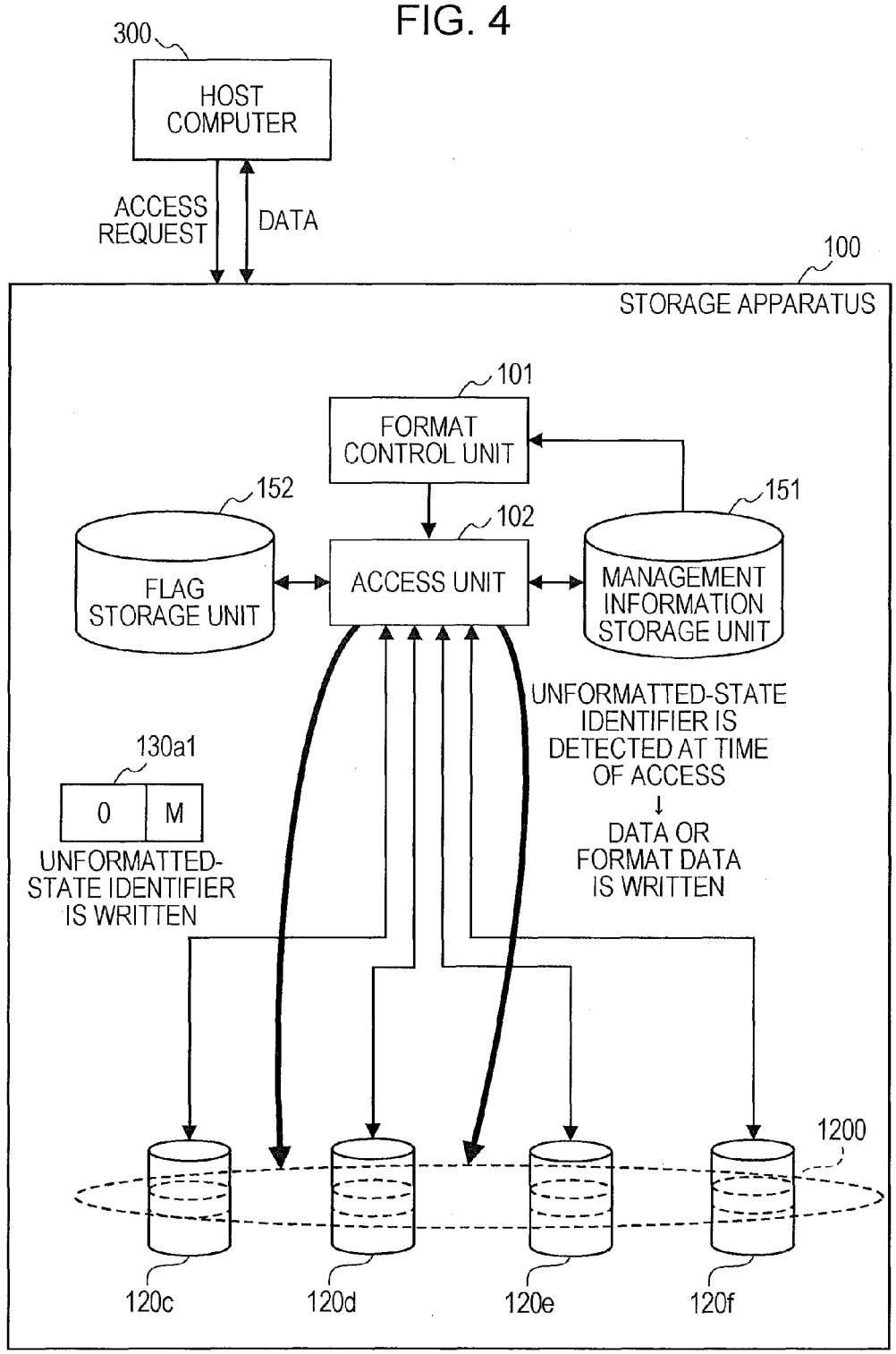
FIG. 4 is a block diagram illustrating a function of the storage apparatus according to the second embodiment.

In addition, with respect to the data structure of data, various modifications can be considered in response to the operation form or the like of the storage apparatus 100. In addition, information other than that illustrated in FIG. 3 may be added to data. FIG. 4 is a block diagram illustrating the function of the storage apparatus according to the second embodiment. The storage apparatus 100 according to the present embodiment is connected to the host computer 300 through the LAN. The storage apparatus 100 includes a format control unit 101, an access unit 102, storage devices 120c, 120d, 120e, and 120f, a management information storage unit 151, and a flag storage unit 152.

The format control unit 101 transmits to the access unit 102 a format request for requesting the logical formatting of storage areas in a stripe 1200 included in the storage devices 120c to 120f.

When accepting the format request from the format control unit 101, the access unit 102 initializes the storage devices 120c to 120f. When the storage devices 120c to 120f are initialized, the access unit 102 transmits to the format control unit 101 a format completion report for reporting the completion of logical formatting. In addition, the access unit 102 writes data 130a1, which includes an unformatted-state identifier indicating the incompletion of logical formatting, into storage areas, the number of which is greater than the number of redundancies by one, from among storage areas included in the stripe 1200 extending to the plural storage devices 120c to 120f. Furthermore, the access unit 102 causes the management information storage unit 151 to store therein management information indicating the completion of logical formatting with respect to the storage areas in the stripe into which the data 130a1 including the unformatted-state identifier is written. Here, the number of redundancies means the maximum number of storage devices that can restore stored data even if any of the storage devices 120c to 120f fails to operate properly. For example, the number of redundancies of RAID 5 is 1, and the number of redundancies of RAID 6 is 2.

For example, in the unformatted-state identifier included in the data 130a1, the value of the data portion thereof is "0x0000 . . . 0" (all digits: "0"), and the block ID is set to "0xFFFFFFFFFFFF" (referred to as "unformatted-state mark", hereinafter). Here, the unformatted-state identifier is data to be stored in the stripe 1200 extending to the storage devices 120c to 120f in the present embodiment. The stripe in which the unformatted-state identifier is stored is regarded, on a management table, as a stripe the logical formatting of which has been completed, and the unformatted-state identifier is an identifier indicating that the logical formatting of the stripe has not been completed actually. In addition, in the present embodiment, while the block ID set to "0xFFFFFFFFFFFF" is used as the unformatted-state mark, the value of the unformatted-state mark is not limited to the value but an arbitrary value can be used as the unformatted-state mark. In addition, an arbitrary portion of data to be stored in the storage devices 120c to 120f can be used as an area for the unformatted-state mark.

Next, when a storage area in the stripe 1200 is accessed for writing new data, the access unit 102 reads out existing data stored in a storage area in a stripe that is an access target.

Next, when the unformatted-state identifier is detected from the existing data that has been read out, the access unit 102 writes new data or format data to be written by formatting into the storage area included in the stripe that is an access target. Here, the unformatted-state identifier can be detected on the basis of whether the data portion of data read out from the storage area has a value "0x0000 . . . 0", the value of the CRC is a value "0", or the block ID is the unformatted-state mark "FFFFFFFF" to be set in the block ID of the data 130a1 including the unformatted-state identifier.

In addition, when accepting from the host computer 300 an access request for writing data, the access unit 102 reads out existing data stored in a storage area in a stripe that is an access target, at the time of accessing storage areas in the storage devices 120c to 120f. When the access unit 102 detects the unformatted-state identifier from the existing data that has been read out, and writes new data into the storage area in the stripe that is an access target, the access unit 102 writes the corresponding new data into the storage area in the stripe that is an access target. On the other hand, when the access unit 102 detects the unformatted-state identifier from the existing data that has been read out, and does not write new data into the storage area in the stripe that is an access target, the access unit 102 writes format data into the storage area in the stripe that is an access target.

In addition, the access unit 102 performs a patrol operation by sequentially reading out the storage contents of storage areas in the storage devices 120c to 120f. In addition, when the unformatted-state identifier is detected from the corresponding storage area, the access unit 102 writes format data into the storage area in the stripe from which the unformatted-state identifier is detected. Accordingly, logical formatting is also performed on a stripe, an access request for writing data into which has not been made by the host computer 300.

In addition, when the writing of format data into all stripes in the storage devices 120c to 120f has been completed by performing the patrol operation, the access unit 102 puts a format data write completion flag in the flag storage unit 152 into a valid state.

In addition, in accordance with a Read Bandwidth Write method described later in detail with reference to FIG. 6, the access unit 102 can update with new data a storage area corresponding to a portion of existing data stored in a storage area in the stripe 1200, on the basis of an access for writing new data into the storage area in the stripe 1200. In this case, the access unit 102 reads out existing data not to be updated with new data from the stripe 1200. Next, using the new data and the existing data that has been read out, the access unit 102 calculates new parity that is parity data after the update. Next, the access unit 102 updates, with the new data, existing data in a storage area in the stripe to be updated with the new data, and updates, with the new parity, existing parity that is parity data before the update of the stripe.

In addition, in accordance with a Small Write method described later in detail with reference to FIG. 7, the access unit 102 can update with new data a storage area corresponding to a portion of existing data stored in a storage area in the stripe, on the basis of an access for writing new data into the storage area in the stripe. In this case, the access unit 102 reads out existing data to be updated with new data and existing parity that is parity data before the update of the stripe. Next, using the new data, the existing data that has been read out, and the existing parity that has been read out, the access unit 102 calculates new parity that is parity data after the update. Next, the access unit 102 updates, with the new data, existing data in the storage area in the stripe to be updated with the new data, and updates the existing parity with the new parity.

The storage devices 120c to 120f are included in RAID 5, and include storage areas in which data can be stored. In the storage devices 120c to 120f, the stripe 1200 including portions of the individual storage devices is set. The access unit 102 stores pieces of data, in units of stripes, in storage areas included in the storage devices 120c to 120f. In addition, the storage devices 120c to 120f are not applied only to the RAID 5 but may be included in RAID 6 or another RAID.

The management information storage unit 151 stores therein the management table in which management information indicating whether or not logical formatting has been performed with respect to storage areas in the storage devices 120c to 120f is stored. Using the management table, whether or not formatting has been completed in units of blocks with respect to storage areas in the storage devices 120c to 120f is managed. In addition, while, in the present embodiment, formatting has not been completed for a storage area into which the unformatted-state identifier is written, the storage area is regarded, on the management table, as a storage area for which formatting has been completed.

The flag storage unit 152 stores a format data write completion flag indicating whether or not the writing of format data into all stripe in the storage devices 120c to 120f has been completed. When the writing of format data into all stripe in the storage devices 120c to 120f has been completed, the format data write completion flag is set to a value (for example, "1") that indicates validity. On the other hand, when there is a stripe, into which format data has not been written, among stripes in the storage devices 120c to 120f, the format data write completion flag is set to a value (for example, "0") that indicates invalidity.

Figure 5:
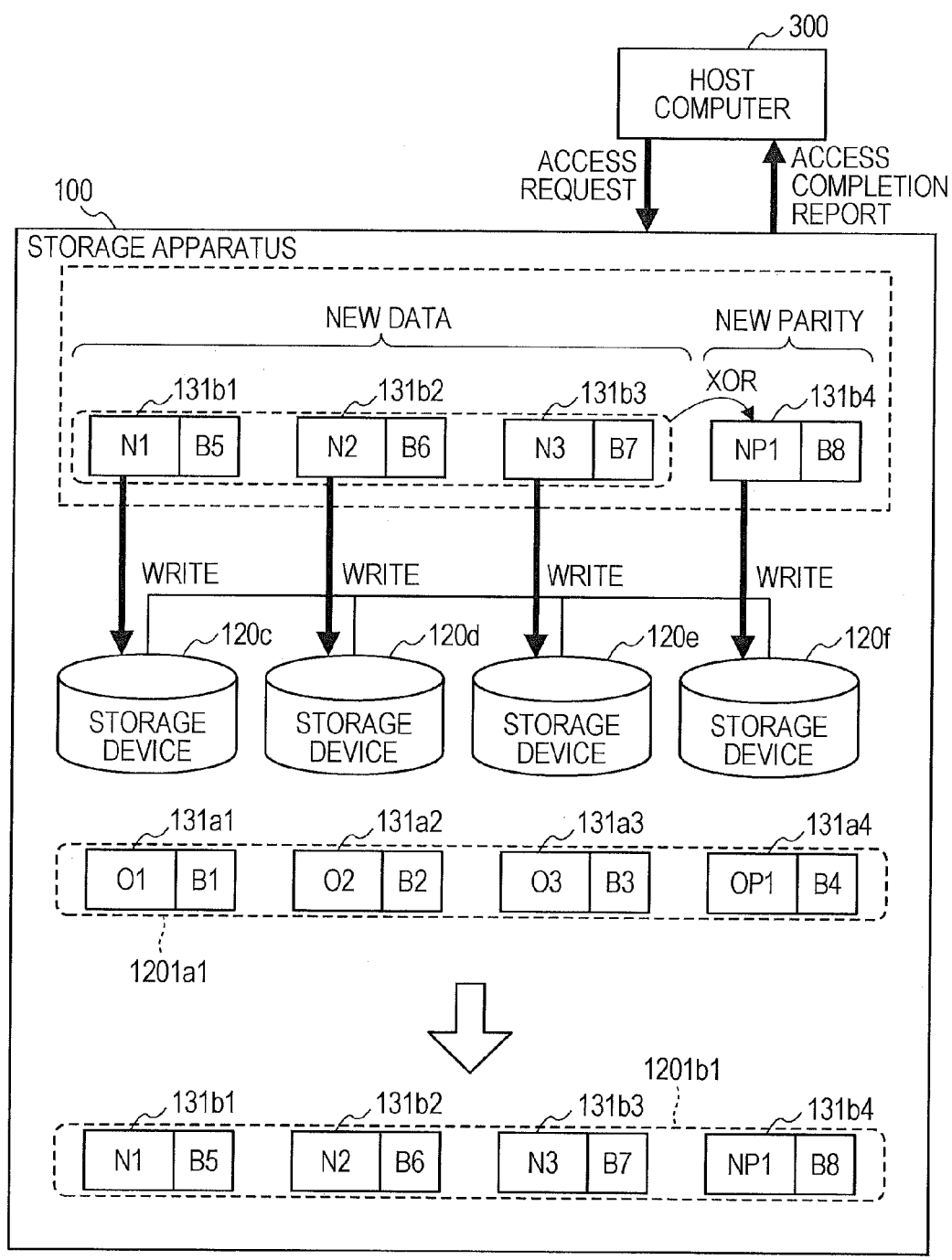
FIG. 5 is a diagram illustrating a Bandwidth Write method according to the second embodiment.

When the storage apparatus 100 according to the present embodiment is operated using a RAID 5 function, three types of write methods such as a Bandwidth Write method, a Read Bandwidth Write method, and a Small Write method can be used for a write processing operation. The Bandwidth Write method, described later in detail with reference to FIG. 5, is a write method in which data in storage areas in all storage devices included in a stripe is updated. In addition, the Read Bandwidth Write method and the Small Write method are write methods in which data in some storage devices included in a stripe is updated.

Figure 21:
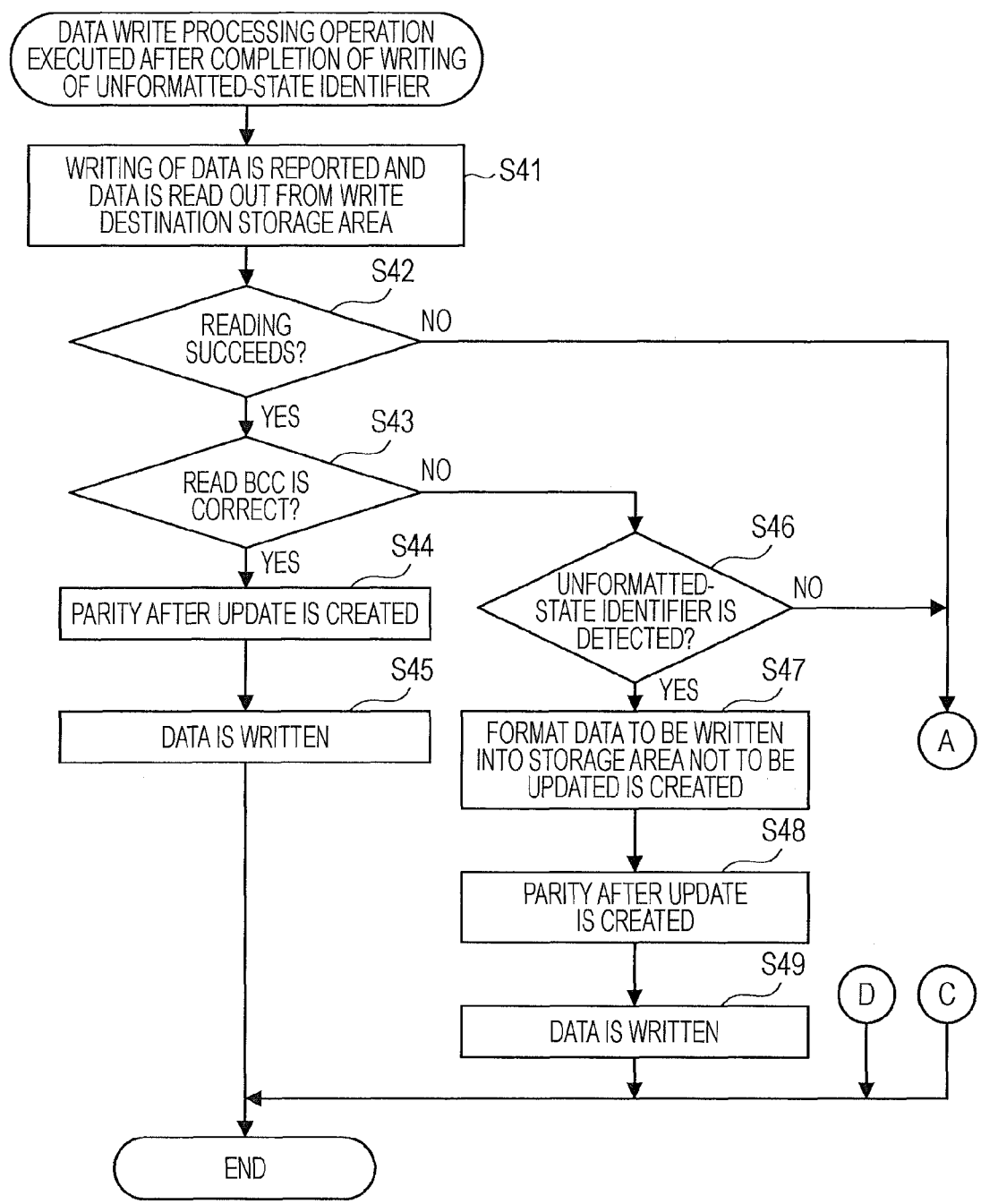
FIG. 21 is a flowchart illustrating a procedure of a data write processing operation executed after the completion of writing of an unformatted-state identifier according to the second embodiment.
Figure 22:
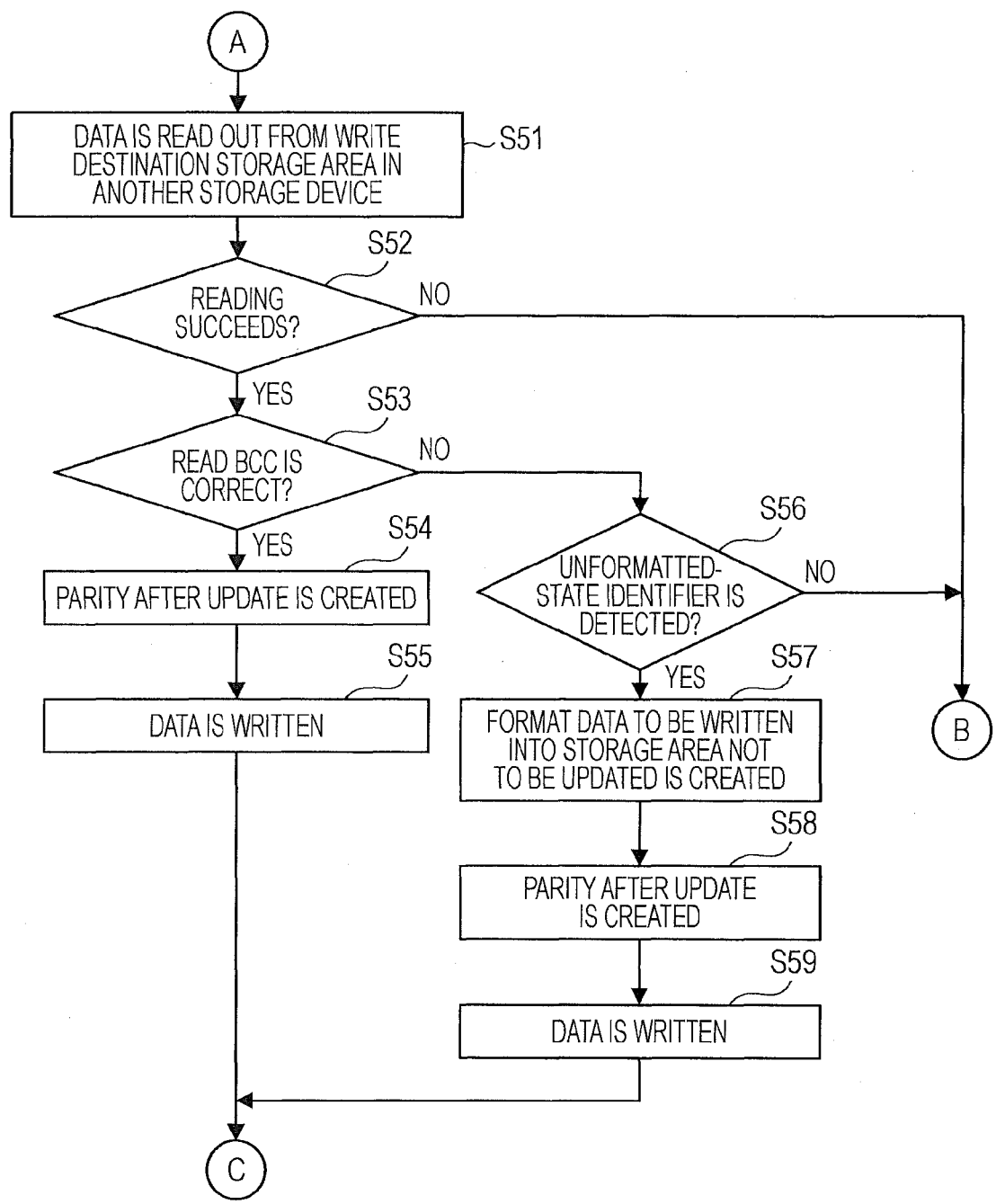
FIG. 22 is a flowchart illustrating a procedure of a data write processing operation executed after the completion of writing of an unformatted-state identifier according to the second embodiment.
Figure 23:
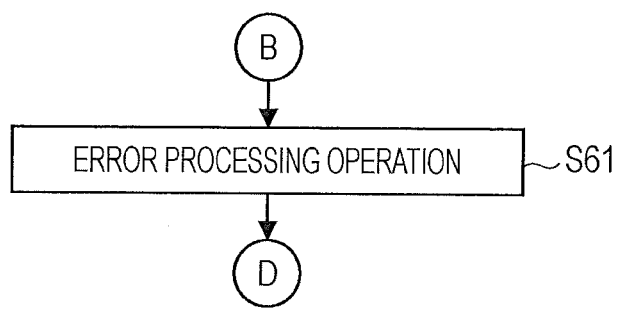
FIG. 23 is a flowchart illustrating a procedure of a data write processing operation executed after the completion of writing of an unformatted-state identifier according to the second embodiment.

When the Read Bandwidth Write method or the Small Write method is used for an access request made by the host computer 300 for writing data, the storage apparatus 100 according to the present embodiment writes data using a data write processing operation executed after the completion of the writing of the unformatted-state identifier, the data write processing operation being described later with reference to FIGS. 21 to 23. On the other hand, when the Bandwidth Write method is used for an access request for writing data, the storage apparatus 100 creates parity for a write request after transmitting a data-write report to the host computer 300, and writes data and the created parity into stripes extending to the storage devices 120c to 120f.

Here, in the present embodiment, in any of the Bandwidth Write method, the Read Bandwidth Write method, and the Small Write method, one of data for a write request or format data is written into all storage areas in a stripe. Accordingly, the data structure of the stripe becomes the same as that in a case in which data is written after logical formatting.

In the storage apparatus 100, a storage area in which the block of data to be updated is stored and a storage area in which the block of data not to be updated is stored are analyzed, and these three types of write methods are selectively used in response to the number of blocks of data to be updated at the time of writing of data. Selectively using these three types of write methods, writing of data into a storage area in which the block of data to be updated is stored is performed, and writing of data into a storage area in which the block of data not to be updated is stored is omitted. Accordingly, a load on a storage device at the time of an access is reduced.

The details of the three types of write methods will be illustrated, hereinafter. FIG. 5 is a diagram illustrating the Bandwidth Write method according to the second embodiment. The Bandwidth Write method performed in the storage apparatus 100 according to the present embodiment will be described with reference to FIG. 5.

The Bandwidth Write method is a write method in which new parity, which is parity after the update of data written into a stripe, is created by performing an eXclusive OR (XOR) operation on data to be newly written into a stripe extending to the storage devices 120c to 120f, and then the new data and the new parity are written into storage areas in the stripe. The Bandwidth Write method is suitable for a case in which all blocks of data are updated by the writing of new data with respect to an access request.

The Bandwidth Write method will be described on the basis of a specific example. Here, as illustrated in FIG. 5, it is assumed that data 131a1, data 131a2, and data 131a3, which are pieces of existing update target data already stored in storage areas that are the targets of an access request for writing, and existing parity data 131a4, which is existing parity generated from the pieces of data 131a1 to 131a3, are stored in a stripe 1201a1 extending to the storage devices 120c to 120f included in the storage apparatus 100.

Here, "O1" on the left side of the data 131a1 (data: "O1"; BCC: "B1") in FIG. 5 indicates that "O" is "existing data (Old)". In addition, the number "1" is a number assigned for convenience of description in the present embodiment, and indicates that the data 131a1 corresponds to data 131b1 ("1" of "N1" on the left side of the data 131b1) that is new data to be written, in an overwriting manner on the basis of update based on a write access request, into the same storage area as the data 131a1, in a stripe 1201b1 extending to the storage devices 120c to 120f described later.

In addition, "B1" on the right side of the data 131a1 indicates that "B" corresponds to a "BCC" and "1" corresponds to the "first" BCC. The number is a number assigned for convenience of description in the present embodiment, and indicates that BCCs in different pieces of data are different from one another.

In addition, in the same way, "O2" on the left side of the data 131a2 (data: "O2"; BCC: "B2") indicates that the data 131a2 corresponds to data 131b2 that is new data to be written, on the basis of update, into the same storage area as the data 131a2, in the stripe 1201b1. In addition, in the same way, "O3" on the left side of the data 131a3 (data: "O3"; BCC: "B3") indicates that that the data 131a3 corresponds to data 131b3 that is new data for the same storage area in the stripe 1201b1. In addition, "OP1" on the left side of the data 131a4 (data: "OP1"; BCC: "B4") that is existing parity indicates that "OP" is "existing parity (old parity)" generated from the pieces of data 131a1 to data 131a3, which are pieces of existing data, and, in the same way, "1" indicates that the data 131a4 corresponds to data 131b4 that is new parity to be written, on the basis of update, into the same storage area in the stripe 1201b1.

In addition, it is assumed that an access request for writing the pieces of data 131b1, 131b2, and 131b3 that are pieces of new data is made by the host computer 300 to the storage apparatus 100.

When accepting the access request for writing the pieces of data 131b1, 131b2, and 131b3, the access unit 102 in the storage apparatus 100 calculates the data 131b4 that is new parity by performing an XOR operation among the pieces of data 131b1, 131b2, and 131b3.

Next, the access unit 102 writes the pieces of data 131b1, 131b2, 131b3, and 131b4 into a stripe extending to the storage devices 120c to 120f, in which existing data that is the target of the access request has been stored. Accordingly, the storage content of the stripe in which existing data has been stored is overwritten and hence updated from the stripe 1201a1 to the stripe 1201b1.

Here, "N1" on the left side of the data 131b1 (data: "N1"; BCC: "B5") in FIG. 5 indicates that "N" is "New data", and the number "1" indicates that, as described above, the data 131b1 corresponds to the data 131a1 that has been stored in the storage area in the stripe 1201a1, which is the target for writing the data 131b1, and is existing data to be updated on the basis of the writing of the data 131b1. In addition, in the same way, "N2" on the left side of the data 131b2 (data: "N2"; BCC: "B2") indicates that the data 131b2 corresponds to the data 131a2 for the storage area into which the data 131b2 is to be written in the stripe 1201a1. In addition, "N3" on the left side of the data 131b3 (data: "N3"; BCC: "B3") indicates that the data 131b3 corresponds to the data 131a3 for the storage area into which the data 131b2 is to be written in the stripe 1201a1. In addition, "NP1" on the left side of the data 131b4 (data: "NP1"; BCC: "B4") that is new parity indicates that "NP" is "new parity" generated from the pieces of data 131b1 to data 131b3, which are pieces of new data, and "1" indicates that, in the same way, the data 131b4 corresponds to the data 131a4, which has been stored in the storage area into which the stripe 1201a1 is written and is existing parity to be updated on the basis of the writing of the data 131b4.

Figure 6:
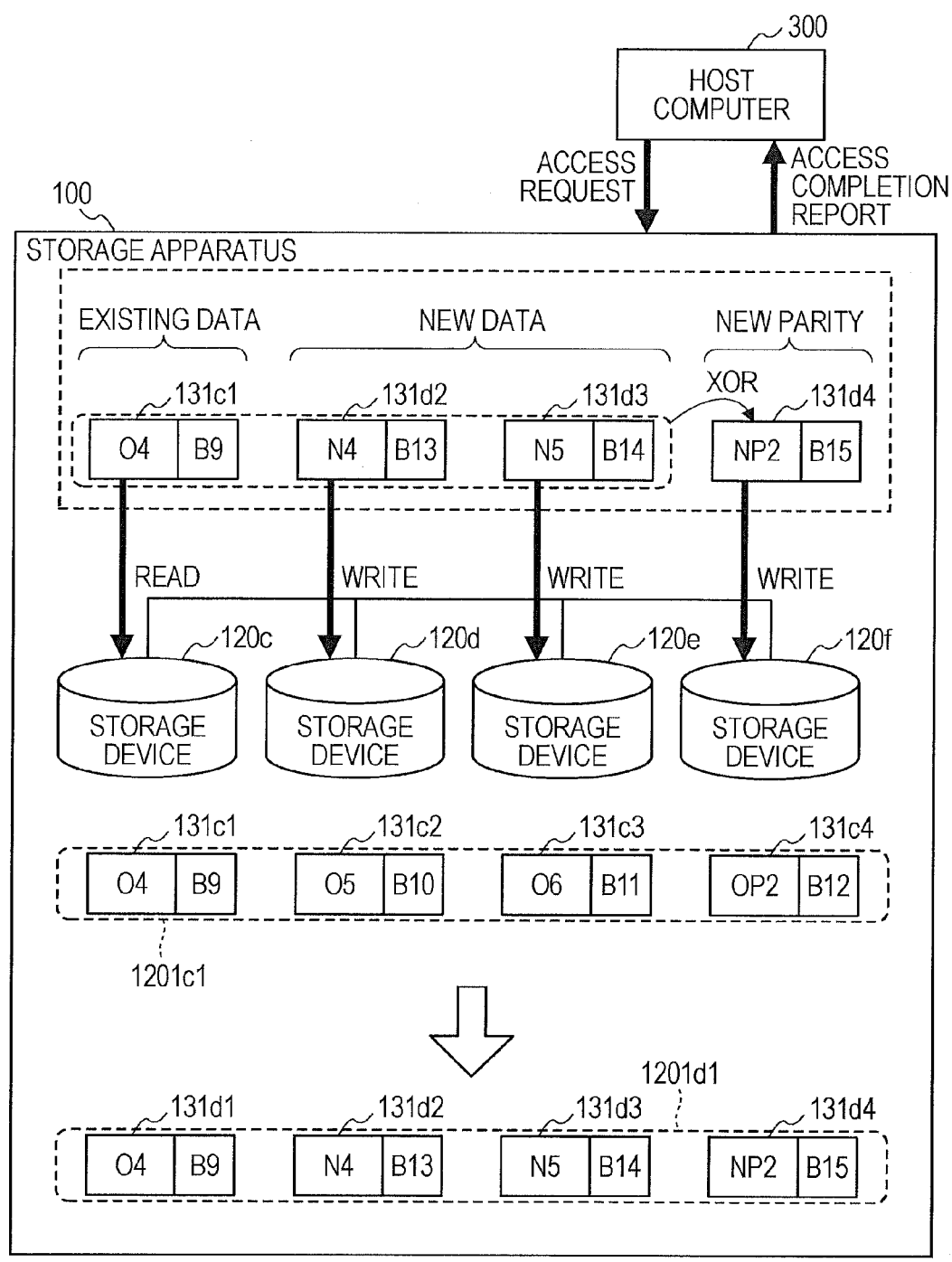
FIG. 6 is a diagram illustrating a Read Bandwidth Write method according to the second embodiment.

FIG. 6 is a diagram illustrating the Read Bandwidth Write method according to the second embodiment. The Read Bandwidth Write Method performed in the storage apparatus 100 according to the second embodiment will be described with reference to FIG. 6.

The Read Bandwidth Write method is a method in which existing data other than existing update target data is read out from a stripe extending to the storage devices 120c to 120f, new parity is created by performing an XOR operation on the existing data that has been read out and data to be newly written, and then the new data and the new parity are written into storage areas in the stripe. The Read Bandwidth Write method is suitable for a case in which a block to be updated with new data and a block in which existing data is not updated are mixed with respect to an access request, and the number of blocks to be updated is greater than the number of blocks not to be updated.

The Read Bandwidth Write method will be described on the basis of a specific example. Here, as illustrated in FIG. 6, it is assumed that data 131c1 (data: "O4"; BCC: "B9"), data 131c2 (data: "O5"; BCC: "B10"), and data 131c3 (data: "O6"; BCC: "B11"), which are pieces of existing data as update targets based on an access request for writing, and existing parity data 131c4 (data: "OP2"; BCC: "B12"), which is existing parity, are stored in a stripe 1201c1 extending to the storage devices 120c to 120f included in the storage apparatus 100. Furthermore, it is assumed that an access request for writing pieces of data 131d2 (data: "N4"; BCC: "B13") and 131d3 (data: "N5"; BCC: "14") that are pieces of new data is made by the host computer 300 to the storage apparatus 100.

When accepting the access request for writing the pieces of data 131d2 and 131d3 that are pieces of new data, the access unit 102 reads out the data 131c1 that is existing data stored in the stripe 1201c1 extending to the storage devices 120c to 120f. Next, the access unit 102 calculates data 131d4 that is new parity by performing an XOR operation between the read data 131c1 and the pieces of data 131d2 and 131d3 the access request for which is accepted.

Next, the access unit 102 writes the pieces of data 131d2, 131d3, and 131d4 into a stripe extending to the storage devices 120c to 120f, in which existing data that is the target of the access request has been stored. Accordingly, the storage content of the stripe in which existing data has been stored is overwritten and hence updated from the stripe 1201c1 to the stripe 1201d1.

Figure 7:
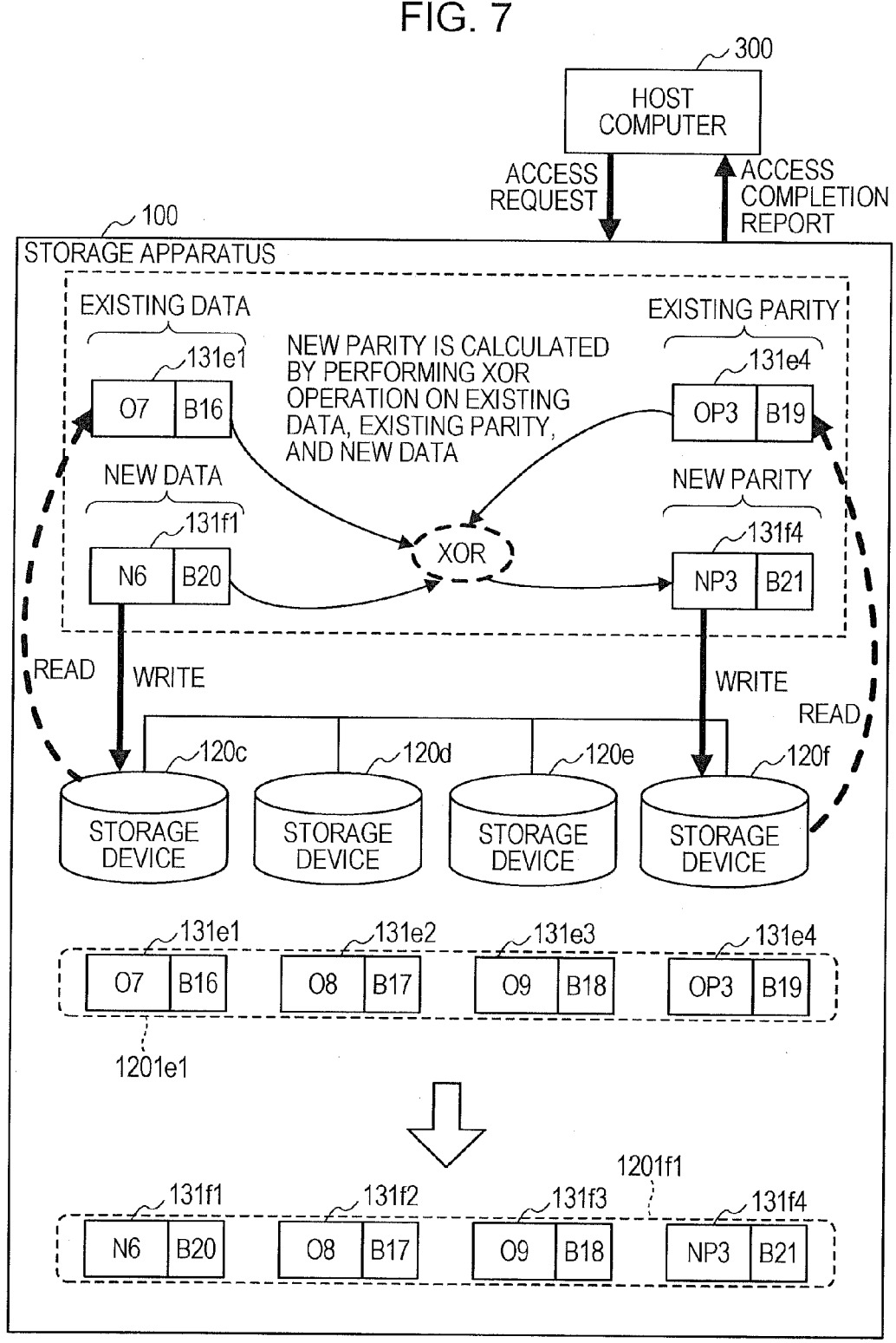
FIG. 7 is a diagram illustrating a Small Write method according to the second embodiment.

FIG. 7 is a diagram illustrating the Small Write method according to the second embodiment. The Small Write method performed in the storage apparatus 100 according to the second embodiment will be described with reference to FIG. 7. The Small Write method is a method in which existing data corresponding to update target data and the existing parity of a stripe are read out from the stripe extending to the storage devices 120c to 120f, new parity is created by performing an XOR operation on the existing data that has been read out, the existing parity, and data to be newly written, and then the new data and the new parity are written into storage areas in the stripe. The Small Write method is suitable for a case in which a block to be updated with new data and a block in which existing data is not updated are mixed with respect to an access request, and the number of blocks to be updated is less than the number of blocks not to be updated.

The Small Write method will be described on the basis of a specific example. Here, as illustrated in FIG. 7, it is assumed that data 131e1 (data: "O7"; BCC: "B16"), data 131e2 (data: "O8"; BCC: "B17"), and data 131e3 (data: "O9"; BCC: "B18"), which are pieces of existing data as update targets based on an access request, and existing parity data 131e4 (data: "OP3"; BCC: "B17"), which is existing parity, are stored in a stripe 1201e1 extending to the storage devices 120c to 120f included in the storage apparatus 100. Furthermore, it is assumed that an access request for writing data 131f1 (data: "N6"; BCC: "20") that is new data is made by the host computer 300 to the storage apparatus 100.

When accepting the access request for writing the data 131f1 that is new data, the access unit 102 reads out the data 131e1 corresponding to the data 131f for which the access request is made and the data 131e4 that is existing parity, which are existing data stored in the stripe 1201e1 extending to the storage devices 120c to 120f. Next, the access unit 102 calculates data 131f4 that is new parity by performing an XOR operation between the pieces of data 131e1 and 131e4 read out from the stripe and the 131f1 the access request for which is accepted.

Next, the access unit 102 writes the pieces of 131f1 and 131f4 into the stripe extending to storage devices 120c to 120f, in which existing data that is the target of the access request has been stored. Accordingly, the storage content of the stripe in which existing data has been stored is overwritten and hence updated from the stripe 1201e1 to the stripe 1201f1.

Figure 8:
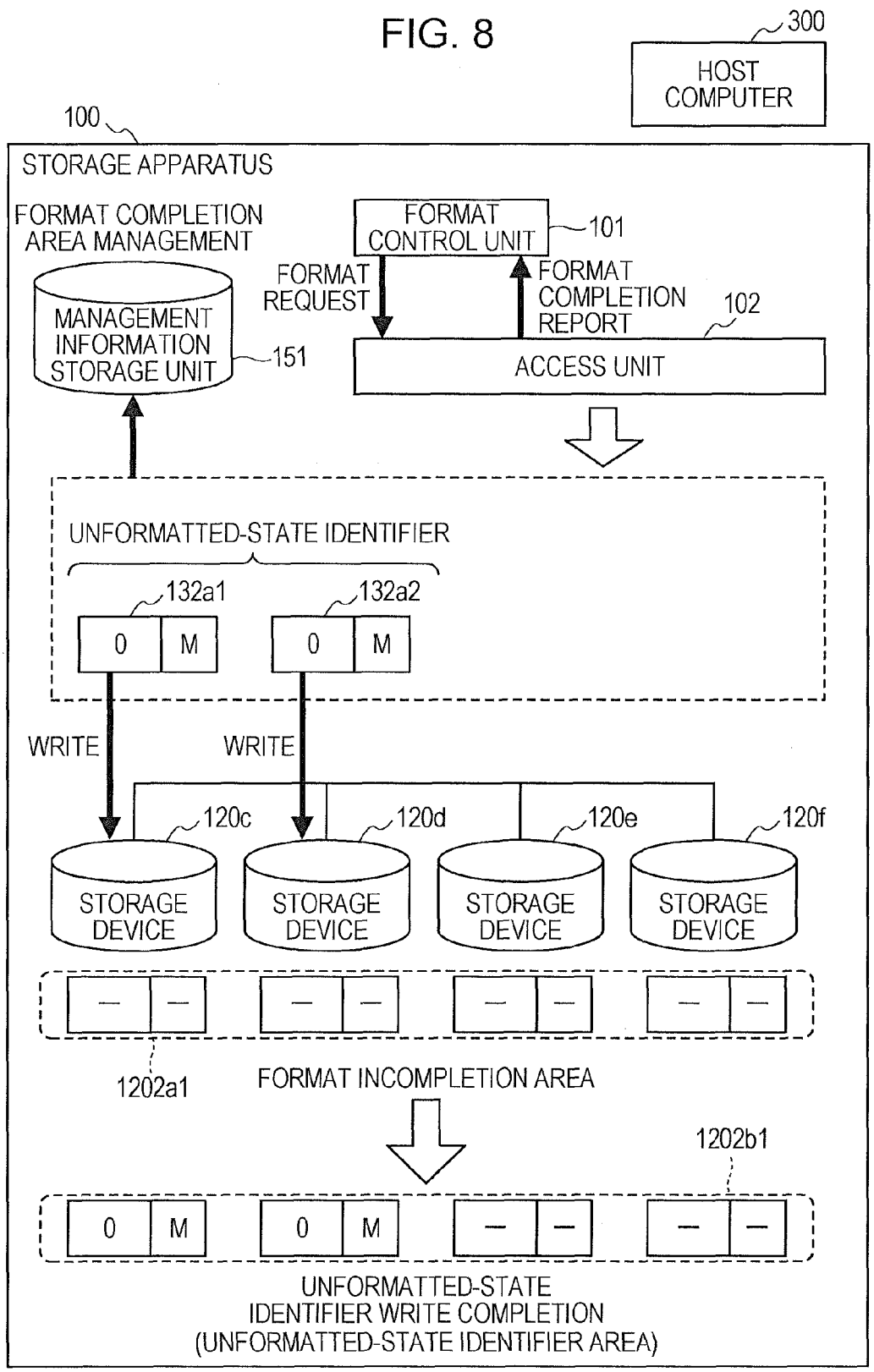
FIG. 8 is a diagram illustrating an operation for writing an unformatted-state identifier according to the second embodiment.

Next, an operation for writing unformatted-state identifiers into storage areas in the storage devices 120c to 120f, performed in the storage apparatus 100 according to the present embodiment, will be described. FIG. 8 is a diagram illustrating the operation for writing an unformatted-state identifier according to the second embodiment. Without performing logical formatting at the time of the initialization of the storage devices 120c to 120f, the storage apparatus 100 according to the second embodiment writes unformatted-state identifiers into storage areas in each stripe, the unformatted-state identifiers identifying that the logical formatting of the stripe has not been performed.

The processing operation in which the storage apparatus 100 writes the unformatted-state identifier will be described on the basis of a specific example. Here, as illustrated in FIG. 8, it is assumed that all storage areas in the storage devices 120c to 120f included in the storage apparatus 100 are format incompletion areas in which logical formatting has not been performed. In addition, it is assumed that a stripe 1202a1 corresponds to a storage area, which is assigned to one stripe, from among format incompletion areas in which logical formatting has not been performed.

Here, "-" on the left side of each block in the stripe 1202a1 indicates that the storage devices 120c to 120f are in initial states and the data portion of the block has not been overwritten. In addition, "-" on the right side of each block in the stripe 1202a1 indicates that, in the same way, the BCC of the block is in an initial state and has not been overwritten.

Furthermore, it is assumed that a format request for requesting the execution of logical formatting of the storage devices 120c to 120f has been made by the format control unit 101 to the access unit 102.

When accepting the format request for the storage devices 120c to 120f from the format control unit 101, the access unit 102 in the storage apparatus 100 outputs to the format control unit 101a format completion report for reporting the completion of logical formatting, and writes the unformatted-state identifier into each stripe extending to the storage devices 120c to 120f. Here, "0" on the left side of each of pieces of data 132a1 and 132a2 that are unformatted-state identifiers indicates that a value included in each of the pieces of data 132a1 and 132a2 is "0x0000 . . . 0". In addition, "M" on the left side of each of the pieces of data 132a1 and 132a2 indicates that the block ID of the BCC is "0xFFFFFFFFFFFF" corresponding to the unformatted-state mark and the CRC is "0". Accordingly, the pieces of data 132a1 and 132a2 that are unformatted-state identifiers are written into a portion of the storage area of each stripe extending to the storage devices 120c to 120f. Therefore, the stripe 1202a1 that is a format incompletion area where formatting has not been completed and an unformatted-state identifier has not been written is updated to the stripe 1202b1, into a portion of the storage area of which the unformatted-state identifier is written. Namely, by writing the unformatted-state identifier into the stripe 1202a1, the format incompletion area changes to an unformatted-state identifier area illustrated in the stripe 1202b1. In addition, at this time, regarding the storage area of the stripe 1202b1 as a logically formatted storage area, the access unit 102 updates the management table.

At this time, the access unit 102 writes the unformatted-state identifiers into blocks in storage devices, the number of which is the number of redundancies of RAID+1 (for example, 2), from among storage areas in the stripe. Accordingly, for example, when the access unit 102 detects the unformatted-state identifier of the stripe 1202b1, the unformatted-state identifier written into the storage device 120d can be detected even if an error in reading the storage area of the storage device 120c in the stripe 1202b1 occurs. Accordingly, the unformatted-state identifier written into the stripe 1202b1 can be detected. In addition, compared with a case in which the unformatted-state identifiers are written into all storage areas of the stripe, a time necessary for writing the unformatted-state identifiers can be reduced, and hence the load of the processing performed in the storage apparatus 100 and loads on the storage devices 120c to 120f can be reduced. Here, it may be assumed that the number of redundancies of RAID is the number of storage devices that can restore data even if the storage devices included in the RAID simultaneously fail to operate properly. For example, in the case of RAID 5, even if one storage device fails to operate properly, data can be restored. Accordingly, the number of redundancies of RAID 5 is 1. In the same way, the number of redundancies of RAID 6 is 2.

In addition, the writing of the unformatted-state identifier is not limited to the example but the access unit 102 may write the unformatted-state identifier into only the storage area of one storage device from among storage areas included in the stripe, or may write the unformatted-state identifier into the storage area of more than two storage devices. In addition, the access unit 102 may write the unformatted-state identifier into the storage areas of all storage devices from among storage areas included in the stripe.

Next, regarding the storage area of the stripe into which the unformatted-state identifier is written as a logically formatted storage area, the access unit 102 updates the management table stored in the management information storage unit 151. Accordingly, while the logical formatting of the stripe into which the unformatted-state identifier is written has not been completed actually, the stripe is treated as a stripe the logical formatting of which has been completed. In addition, when the unformatted-state identifier is detected from the stripe later, format data or data for an access request is written into the storage area of the stripe into which the unformatted-state identifier is written.

In addition, a case may occurs in which, when the unformatted-state identifier is being written into each stripe, an access request for writing data is made by the host computer 300. The case will be described later with reference to FIGS. 10, 18, and 19.

In addition, the access unit 102 may acquire device information indicating the RAID configuration of the storage devices 120c to 120f in the storage apparatus 100, and determine a RAID type. In addition, when the configuration is not suitable for the writing of the unformatted-state identifier, namely, in a case or the like in which the configuration is a mirroring structure such as RAID 1 or the like, the access unit 102 may execute normal logical formatting.

Figure 9:
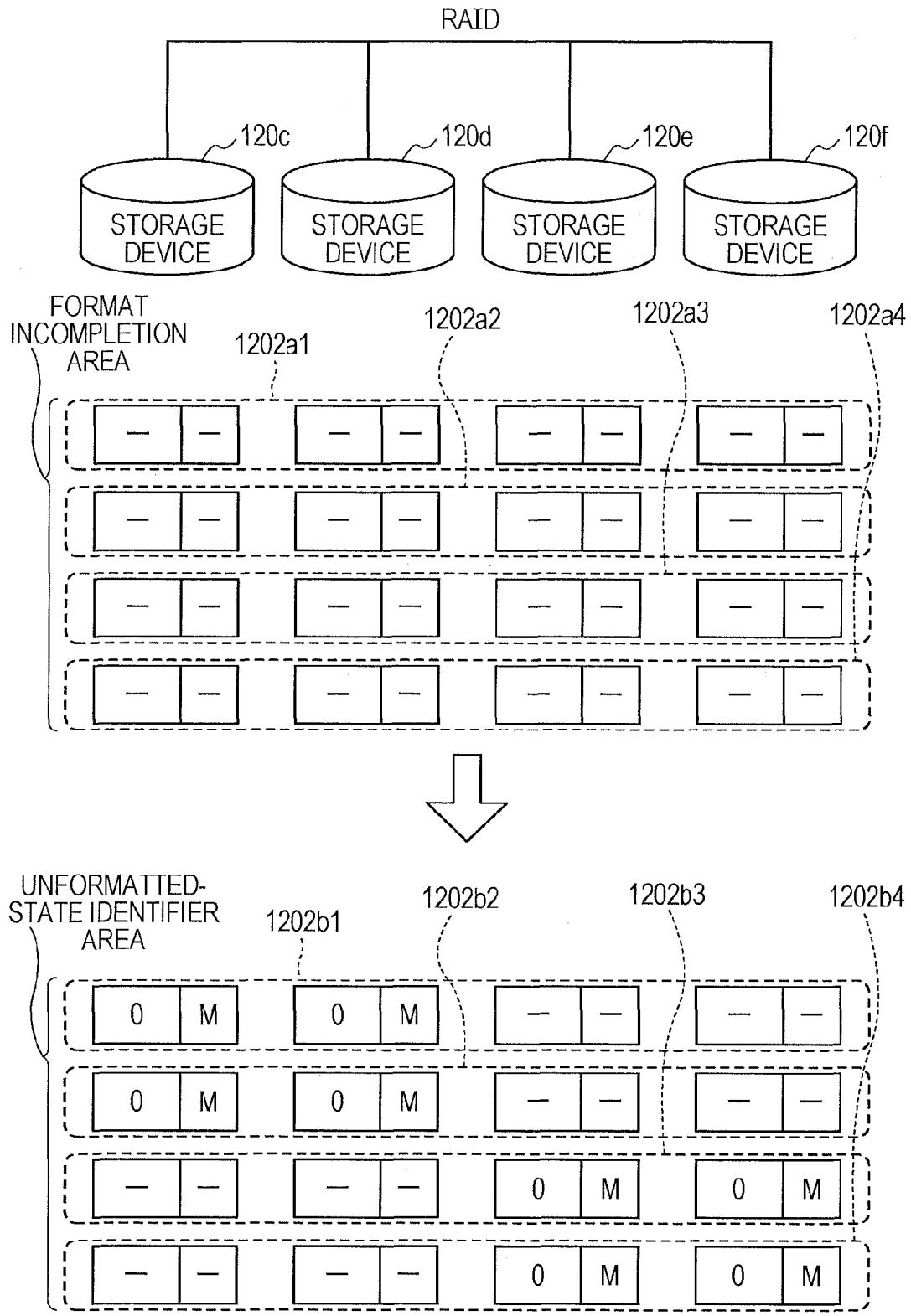
FIG. 9 is a diagram illustrating a storage area into which the unformatted-state identifier according to the second embodiment is written.

FIG. 9 is a diagram illustrating a storage area into which the unformatted-state identifier according to the second embodiment is written. As described with reference to FIG. 8, the storage apparatus 100 according to the present embodiment writes the unformatted-state identifier into the storage area of each stripe at the time of initializing, with respect to the storage devices 120c to 120f included in the RAID. The storage area of the stripe into which the unformatted-state identifier is written by the storage apparatus 100 will be described with reference to FIG. 9.

As illustrated in stripes 1202a1, 1202a2, 1202a3, and 1202a4 in FIG. 9, with respect to the storages devices 120c to 120f included in the storage apparatus 100 according to the present embodiment before being initialized, all storage areas thereof have not been logically formatted, and are format incompletion areas into which no data is written.

In the present embodiment, as illustrated in stripes 1202b1, 1202b2, 1202b3, and 1202b4, as an initializing process, the access unit 102 writes the unformatted-state identifier into each stripe extending to the storage devices 120c to 120f, thereby causing the stripe to become an unformatted-state identifier area. At this time, as described above, with respect to each stripe, the access unit 102 writes the unformatted-state identifiers into storage areas the number of which is the number of redundancies +1. Therefore, compared with a case in which the unformatted-state identifiers are written into all storage areas of the stripe or a case in which logical formatting is performed on all storage areas of the stripe, a processing time necessary for writing the unformatted-state identifiers can be reduced, and the load of the processing performed in the storage apparatus 100 and loads on the storage devices 120c to 120f can be reduced.

Here, a relationship between the number of storage areas included in each stripe and the number of storage areas into which the unformatted-state identifiers are written is as follows. For example, in the case of a RAID 5 system in which three data storage drives and one parity drive, namely four storage devices in total, are used, as illustrated in FIG. 9, it turns out that the unformatted-state identifiers are written into two storage areas from among four storage areas included in the same stripe. In addition, in the case of a RAID 5 system not illustrated in FIG. 9, in which 15 data storage drives and 1 parity drive, namely 16 storage devices in total, are used, it turns out that the unformatted-state identifiers are written into 2 storage areas from among 16 storage areas. In this way, compared with a method in which format data used for completing formatting (or, data such as the unformatted-state identifier or the like, used for regarding a storage area as a storage area in which formatting has been completed), the number of storage areas into which the unformatted-state identifiers are written dose no increase when the number of storage devices included in the RAID is large. Therefore, in a RAID system including a number of storage devices, the advantageous effects of the reduction of a processing time necessary for writing the unformatted-state identifiers and the reduction of the load of the processing performed in the storage apparatus 100 and loads on the storage devices 120c to 120f becomes larger.

Figure 10:
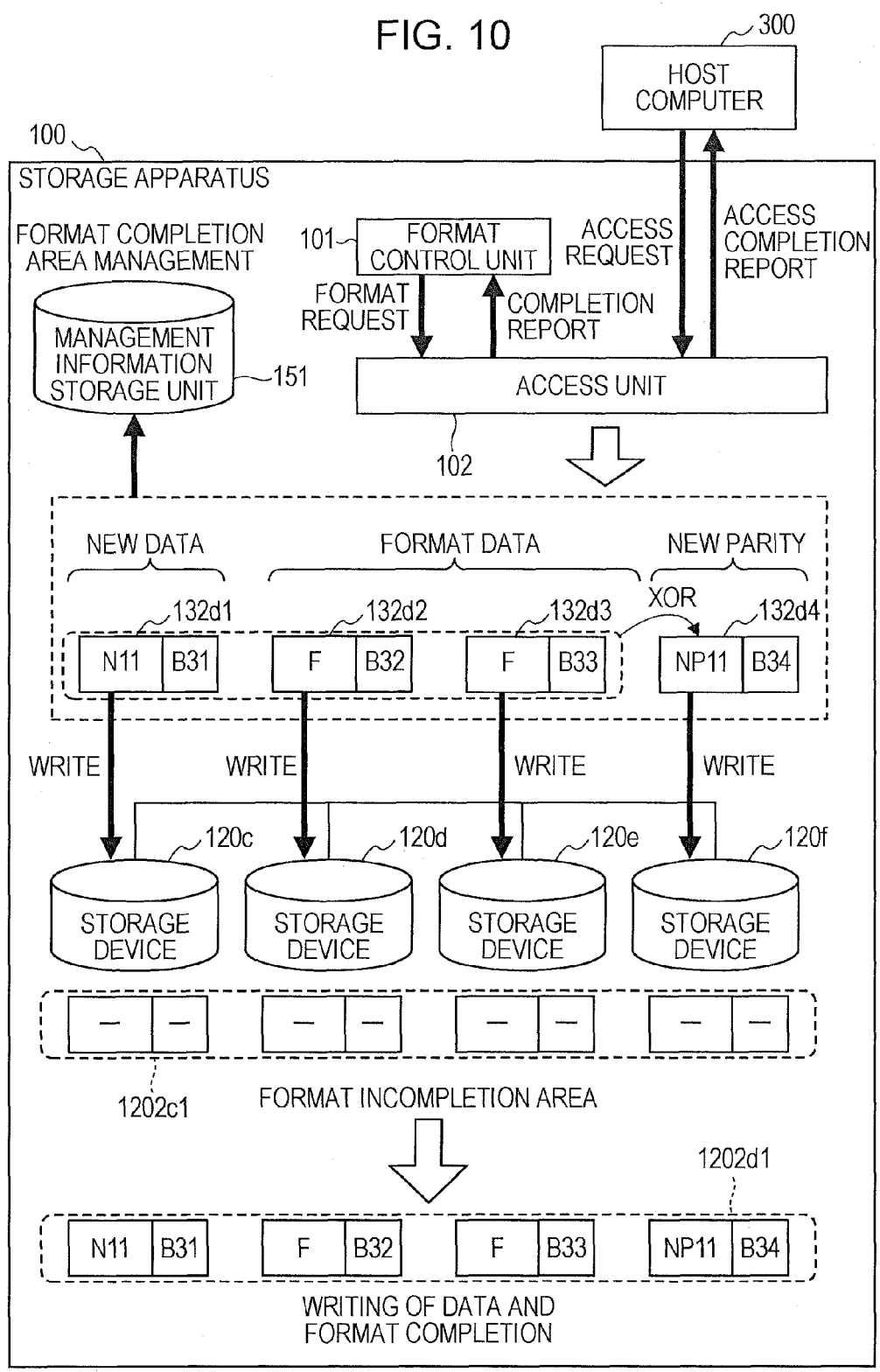
FIG. 10 is a diagram illustrating an operation performed when data write operations compete against each other during a write operation for the unformatted-state identifier according to the second embodiment.

Next, an operation performed when data write operations compete against each other during a write operation for the unformatted-state identifier, performed in the storage apparatus 100 according to the present embodiment, will be described. FIG. 10 is a diagram illustrating the operation performed when data write operations compete against each other during a write operation for the unformatted-state identifier according to the second embodiment. With reference to FIG. 10, the operation performed when data write operations compete against each other during a write operation for the unformatted-state identifier, performed in the storage apparatus 100 according to the present embodiment, will be described.

Here, as illustrated in FIG. 10, it is assumed that a stripe 1202c1 extending to the storage devices 120c to 120f included in the storage apparatus 100 has not been formatted and is a stripe into which data for an access request is to be written, no unformatted-state identifier has been written into the stripe 1202c1, and the stripe 1202c1 is a format incompletion area. Here, whether or not formatting (or the writing of the unformatted-state identifier used for regarding the storage area, on the management table, as a storage area in which formatting has been completed) to be performed on each storage area in the storage devices 120c to 120f has been completed is managed on the basis of the management table stored in the management information storage unit 151. In addition, it is assumed that an access request for writing data 132d1 (data: "N11"; BCC: "B31") that is new data is made by the host computer 300 to the storage apparatus 100. Furthermore, it is assumed that, in response to the access request for writing the data 132d1, the access unit 102 writes the data 132d1 and a new parity that is parity after update based on the data 132d1 into the storage devices 120c to 120f.

As described with reference to FIG. 8, when accepting the format request for the storage devices 120c to 120f from the format control unit 101, the access unit 102 in the storage apparatus 100 outputs to the format control unit 101a format completion report for reporting the completion of logical formatting, and sequentially writes the unformatted-state identifiers into all stripes extending to the storage devices 120c to 120f. In addition, at this time, the access unit 102 regards the storage areas into which the unformatted-state identifiers are written as logically formatted storage areas, and updates the management table.

A processing operation performed when the unformatted-state identifiers are written will be described in detail with reference to FIG. 18. In addition, when, during the execution of writing of the unformatted-state identifiers into all storage areas, the access unit 102 accepts the access request for writing the data 132d1, made by the host computer 300, the access unit 102 outputs to the host computer 300 an access completion report for reporting the completion of the writing of data.

Next, when a storage area that is the target of the write access request turns out to be a format incompletion area with reference to the management table, the access unit 102 creates pieces of data 132d2 and 132d3 that are pieces of format data to be written into storage areas not to be updated on the basis of the writing of the data 132d1, the storage areas being located in a stripe into which the data 132d1 that is new data accepted from the host computer 300 is to be written. Next, the access unit 102 performs an XOR operation among the pieces of data 132d1 to 132d3, and calculates data 132d4 that is new parity.

Next, the access unit 102 writes the pieces of data 132d1 to 132d4 into the stripe 1202c1 that is a format incompletion area extending to the storage devices 120c to 120f. Accordingly, the pieces of data 132d1 to 132d3 that are pieces of new data and the data 132d4 that is the parity of the new data are written as illustrated in a stripe 1202d1, and the logical formatting of the stripe 1202d1 is completed. In addition, at this time, regarding the storage area of the stripe 1202d1 as a logically formatted storage area, the access unit 102 updates the management table.

Next, the access unit 102 writes the unformatted-state identifier into a subsequent storage area. By repeating the above-mentioned processing operation, the unformatted-state identifiers, pieces of data, the write access request for which is made by the host computer 300, or pieces of format data are written into all storage areas in the storage devices 120c to 120f.

Figure 11:
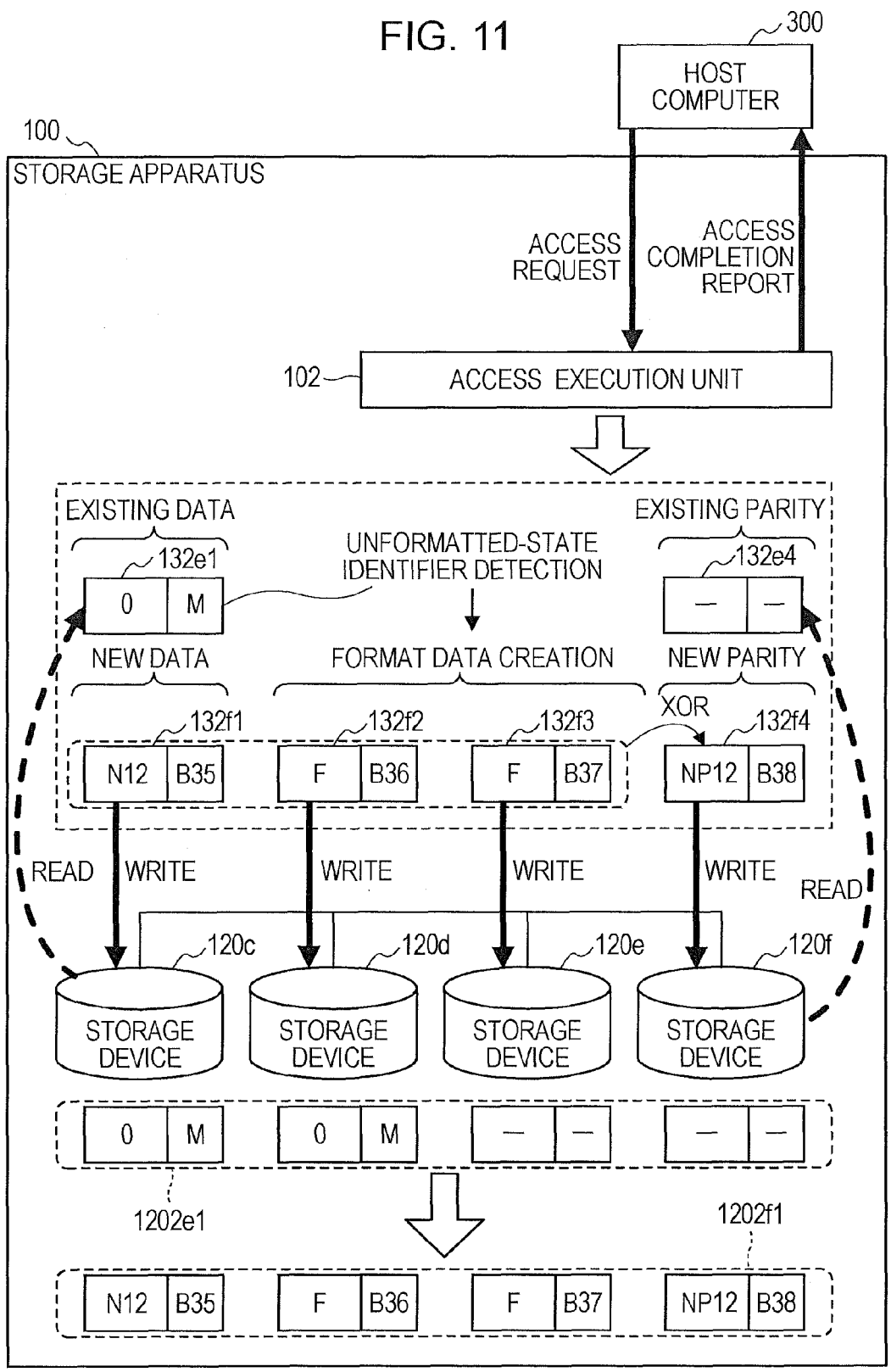
FIG. 11 is a diagram illustrating an operation performed when the unformatted-state identifier has been written into a storage area in a case where data according to the second embodiment is written using the Small Write method.

Next, an operation performed in the storage apparatus 100 according to the preset embodiment when the unformatted-state identifier has been written into a storage area into which data is to be written will be described. FIG. 11 is a diagram illustrating an operation performed when the unformatted-state identifier has been written into a storage area in a case where data according to the second embodiment is written using the Small Write method. An operation will be described with reference to FIG. 11, the operation being performed when the unformatted-state identifier has been already written into a storage area in a stripe that is a write destination in a case where data is written in the storage apparatus 100 according to the preset embodiment using the Small Write method.

Here, as illustrated in FIG. 11, it is assumed that the unformatted-state identifier has been written into a stripe 1202e1 into which data for an access request is to be written, the stripe 1202e1 extending to the storage devices 120c to 120f included in the storage apparatus 100. In addition, it is assumed that an access request for writing data 132f1 that is new data is made by the host computer 300 to the storage apparatus 100. Furthermore, it is assumed that, in response to the access request for writing the data 132f1, the access unit 102 is scheduled to write on the basis of the Small Write method the data 132f1 and a new parity that is parity after update based on the data 132f1 into the storage devices 120c to 120f.

When accepting the access request for writing the data 132f1 from the host computer 300, the access unit 102 in the storage apparatus 100 outputs to the host computer 300 an access completion report for reporting the completion of writing data.

Next, the access unit 102 reads out from a stripe 1202e1 data 132e1 that is existing data corresponding to the data 132f1 and data 132e4 that is existing parity, the stripe 1202e1 being a stripe into which the data 132f1 that is new data accepted from the host computer 300 is to be written. Accordingly, the access unit 102 detects from the read stripe 1202e1 the data 132e1 that is the unformatted-state identifier.

In the present embodiment, when the read data 132e1 is the unformatted-state identifier in which the block ID of the BCC thereof is the unformatted-state mark ("0xFFFFFFFFFFFF") and the CRC thereof has been set to "0", the access unit 102 determines that the stripe 1202e1 in which the data 132e1 has been stored has not been formatted yet. Here, in the present embodiment, considering the possibility that the block ID of data stored in a stripe accidentally matches the unformatted-state mark, when the unformatted-state identifier is detected, it is also checked whether or not the CRC of the data is "0".

In the present embodiment, the data portion of data to which the unformatted-state mark is assigned is set to "0". Therefore, when data is read out from an unformatted storage area, and the CRC thereof is checked, the data is treated as data in which a BCC error occurs (refer to S46 in FIG. 21). In addition, when the BCC error occurs, it is further determined whether or not the unformatted-state mark is detected from the block ID. In addition, when the unformatted-state mark is detected from the block ID, it is determined that the unformatted-state identifier is detected.

Here, the stripe 1202e1 is a stripe including a storage area in which the unformatted-state identifier is stored (the stripe is referred to as an unformatted-state identifier area, hereinafter), and the storage area storing the data 132e4 that is read out as the existing parity of the stripe 1202e1 does not have accurately calculated parity. Therefore, it is difficult to use the pieces of data 132e1 and 132e4 for the calculation of new parity based on the Small Write method. Accordingly, in the present embodiment, even if it is scheduled to write the data 132f1 on the basis of the Small Write method into the stripe 1202e1 from which the unformatted-state identifier has been detected, the write operation based on the Small Write method is not performed. In this case, in the same way as the Bandwidth Write method, the access unit 102 creates pieces of data 132f2 and 132f3 that are pieces of format data to be written into storage areas not to be updated on the basis of the writing of the data 132f1, the storage areas being located in a stripe into which the data 132f1 that is new data accepted from the host computer 300 is to be written. Next, the access unit 102 performs an XOR operation among the pieces of data 132f1 to 132f3, and calculates data 132f4 that is new parity.

Next, the access unit 102 writes the pieces of data 132f1 to 132f4 into the stripe 1202e1 that is a unformatted-state identifier area extending to the storage devices 120c to 120f. Accordingly, the pieces of data 132f1 to 132f3 that are pieces of new data and the data 132f4 that is the parity of the new data are written as illustrated in the stripe 1202f1, and the logical formatting of the stripe 1202f1 is completed. In addition, while, in the example illustrated in FIG. 11, the case is illustrated in which the unformatted-state identifier is detected from the data 132e1 that is existing data, on the basis of a read operation based on the Small Write method, the same operation is also performed when the unformatted-state identifier is detected from the data 132e4 that is existing parity.

Figure 12:
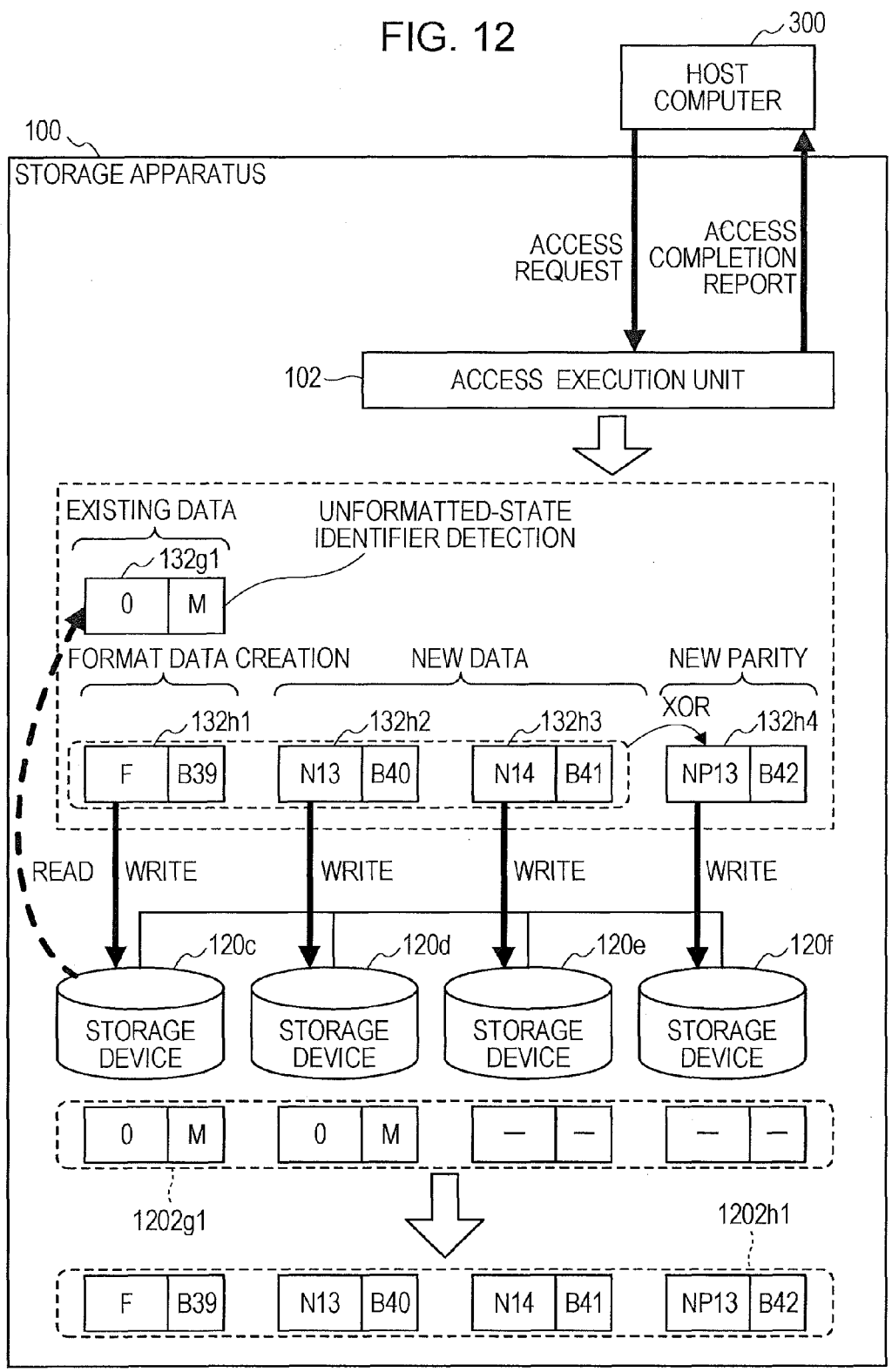
FIG. 12 is a diagram illustrating an operation performed when the unformatted-state identifier has been written into a storage area in a case where data according to the second embodiment is written using the Read Bandwidth Write method.

FIG. 12 is a diagram illustrating an operation performed when the unformatted-state identifier has been written into a storage area in a case where data according to the second embodiment is written using the Read Bandwidth Write method. An operation will be described with reference to FIG. 12, the operation being performed when the unformatted-state identifier has been already written into a storage area in a stripe that is a write destination in a case where data is written in the storage apparatus 100 according to the preset embodiment using the Read Bandwidth method.

Here, as illustrated in FIG. 12, it is assumed that a stripe 1202g1, which is a stripe into which data for an access request is to be written, is an unformatted-state identifier area into which the unformatted-state identifier has been written, the stripe 1202e1 extending to storage devices 120c to 120f included in the storage apparatus 100. In addition, it is assumed that an access request for writing pieces of data 132h2 and 132h3 that are pieces of new data is made by the host computer 300 to the storage apparatus 100. Furthermore, it is assumed that, in response to the access request for writing data 132h1, the access unit 102 is scheduled to write on the basis of the Read Bandwidth Write method the pieces of data 132h2 and 132h3 and a new parity that is parity after update based on the pieces of data 132h2 and 132h3 into the storage devices 120c to 120f.

When accepting the access request for writing the pieces of data 132h2 and 132h3 from the host computer 300, the access unit 102 in the storage apparatus 100 outputs to the host computer 300 an access completion report for reporting the completion of writing data.

Next, the access unit 102 reads out from a stripe 1202g1 data 132g1 that is existing data stored in a storage area not to be updated on the basis of the access request, the storage area being located in the stripe 1202g1 that is a stripe into which the pieces of data 132h2 and 132h3, which are pieces of new data accepted from the host computer 300, are to be written. Accordingly, the access unit 102 detects from the stripe 1202g1 the data 132g1 having the unformatted-state identifier.

In the same way as in FIG. 11, in FIG. 12, when the CRC in the BCC of the read data 132g1 is "0", and the block ID thereof is the unformatted-state mark, the access unit 102 determines that the stripe 1202g1 in which the data 132g1 has been written is the unformatted-state identifier area.

Here, the stripe 1202g1 includes storage areas in which data having the unformatted-state identifier is stored, and the data 132g1 read out as the existing data of the stripe 1202g1 has the unformatted-state identifier. Therefore, it is difficult to use the data 132g1 for the calculation of new parity based on the Read Bandwidth Write method. Accordingly, in FIG. 12, even if it is scheduled to write the pieces of data 132h2 and 132h3 on the basis of the Read Bandwidth Write method into the stripe 1202g1 from which the unformatted-state identifier has been detected, the write operation based on the Read Bandwidth Write method is not performed. In this case, in the same way as the Bandwidth Write method, the access unit 102 creates data 132h1 that is format data to be written into a storage area not to be updated on the basis of the writing of the pieces of data 132h2 and 132h3, the storage area being located in a stripe into which the pieces of data 132h2 and 132h3 that are pieces of new data accepted from the host computer 300 are to be written. Next, the access unit 102 performs an XOR operation among the pieces of data 132h1 to 132h3, and calculates data 132h4 that is new parity.

Next, the access unit 102 writes the pieces of data 132h1 to 132h4 into the stripe 1202g1 that is a unformatted-state identifier area extending to the storage devices 120c to 120f. Accordingly, the pieces of data 132h1 to 132h3 that are pieces of new data and the data 132h4 that is the parity of the new data are written as illustrated in a stripe 1202h1, and the logical formatting of the stripe 1202h1 is completed.

Next, an operation will be described that is performed when neither normal data nor an unformatted-state identifier has been detected during a read operation performed before a write operation based on the Small Write method or the Read Bandwidth Write method is performed in the storage apparatus 100 according to the present embodiment.

In a write operation using the Small Write method and the Read Bandwidth Write method, the storage apparatus 100 reads out a portion of data from a stripe that is a write target before a write operation, as described in FIGS. 6 and 7. In the present embodiment, using the data read operation performed before the write operation, the detection of the unformatted-state identifier from the write target stripe is performed. Here, in some cases, the failure of data readout may occur owing to the disorder of a storage device or the like, or a BCC error may occur in which the BCC of data is invalid while the readout of the data succeeds. In addition, as described with reference to FIG. 9, since the unformatted-state identifier is written into only a portion of a storage area in a stripe in the present embodiment, data in a storage area into which no unformatted-state identifier has been written may be read out in a readout operation performed before a write operation. In this case, with respect to a stripe into which the unformatted-state identifier has been written, the detection of the unformatted-state identifier may become impossible. In addition, with respect to a storage area into which no unformatted-state identifier has been written, since a BCC becomes an invalid value, the BCC can be detected as a BCC error.

On the other hand, in the storage apparatus 100 according to the present embodiment, when an error occurs in such a readout operation performed before an write operation for a storage device, reading of data from a storage area in another storage device included in the same stripe is tried, and the unformatted-state identifier in the stripe is detected.

Figure 13:
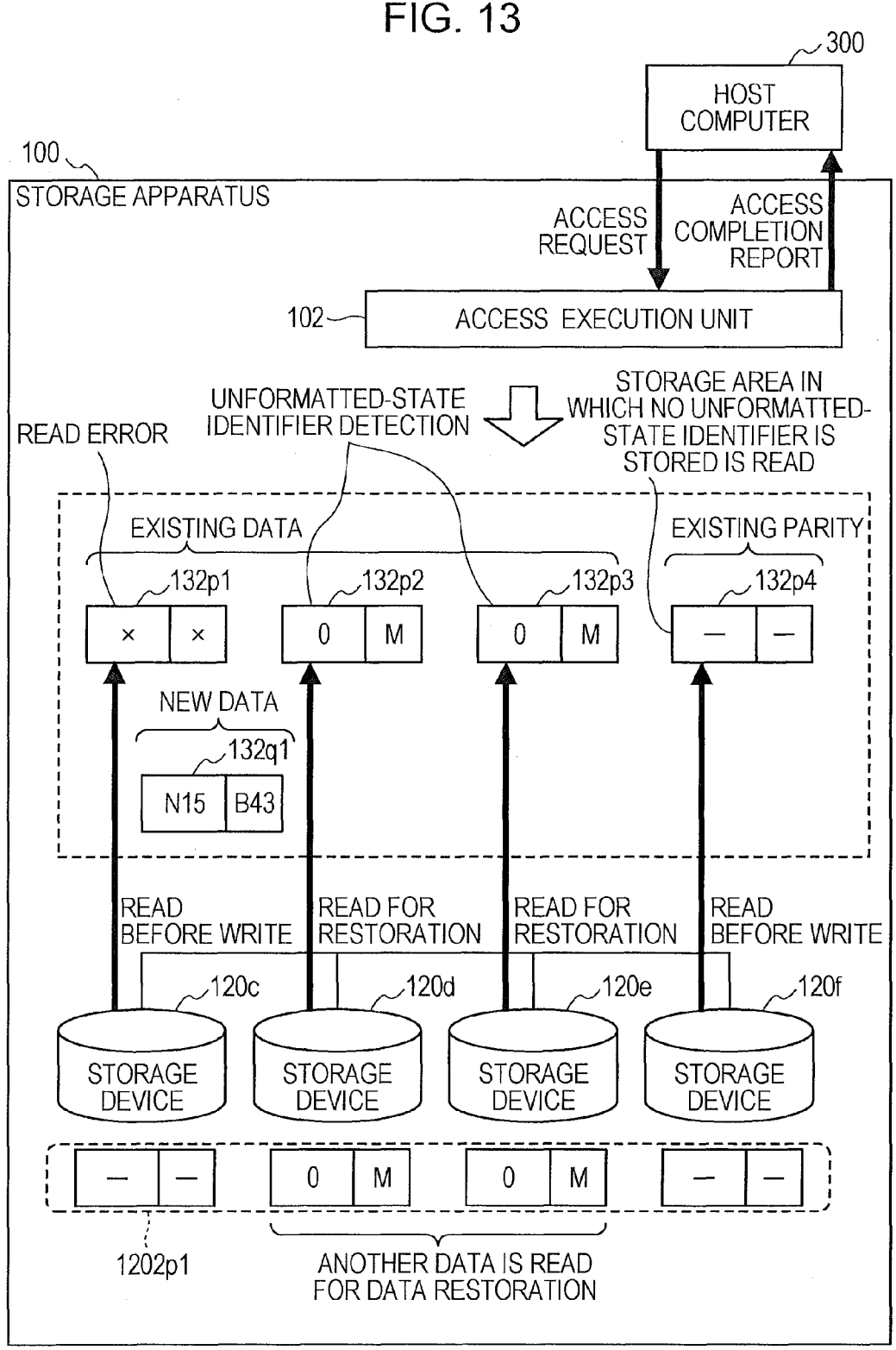
FIG. 13 is a diagram illustrating an operation performed when a read error occurs in a case where data according to the second embodiment is written using the Small Write method.
Figure 14:
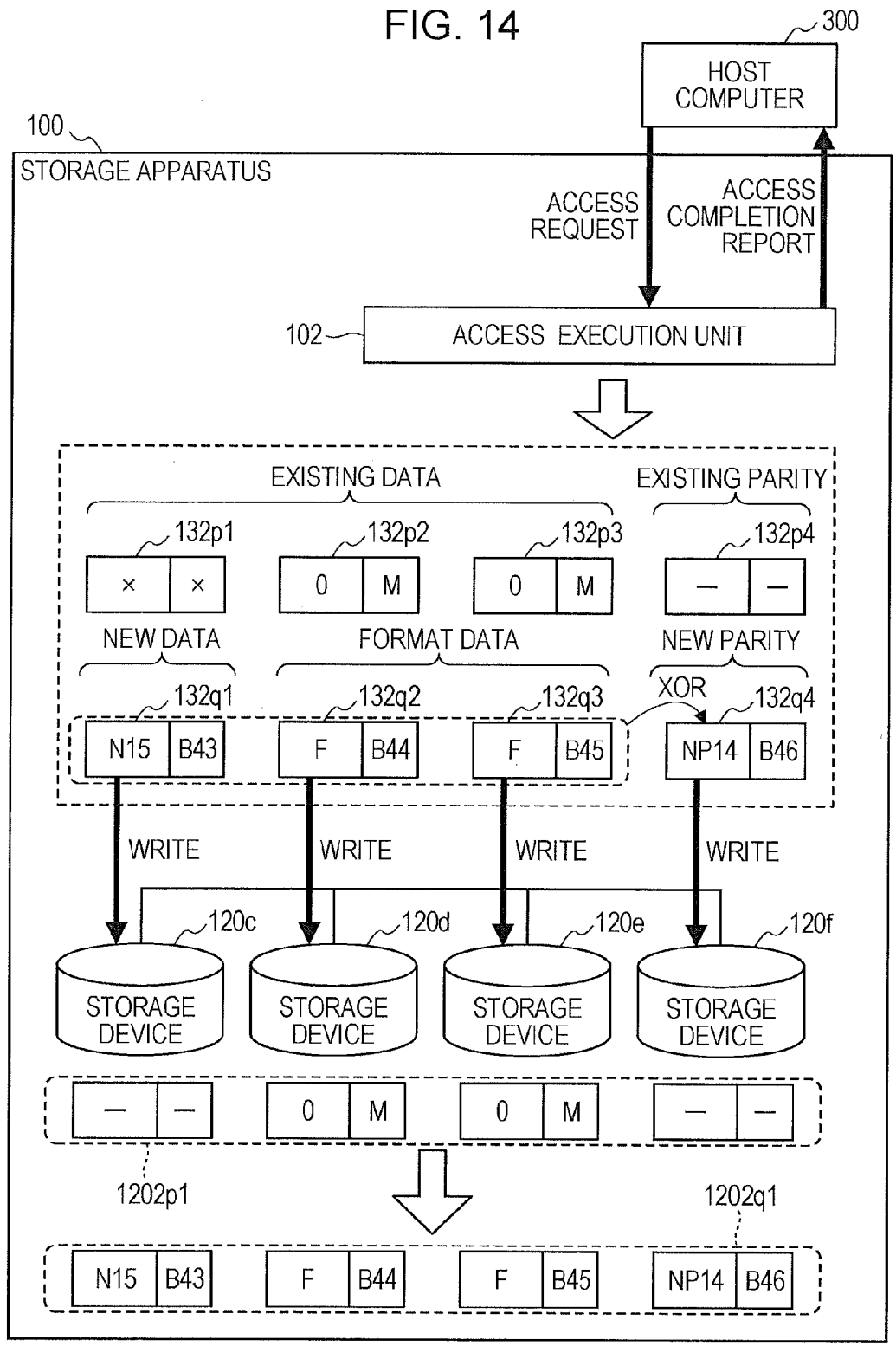
FIG. 14 is a diagram illustrating an operation performed when a read error occurs in a case where data according to the second embodiment is written using the Small Write method.

FIGS. 13 and 14 are diagrams illustrating an operation performed when a read error occurs in a case where data according to the second embodiment is written using the Small Write method. With reference to FIGS. 13 and 14, an operation will be described that is performed when a read error occurs in a case where data is written using the Small Write method in the storage apparatus 100 according to the present embodiment.

Here, as illustrated in FIG. 13, it is assumed that the unformatted-state identifier has been written into a stripe $1202p1$ that is a stripe into which data for an access request is to be written, the stripe $1202p1$ extending to storage devices $120c$ to $120f$ included in the storage apparatus 100. In addition, it is assumed that an access request for writing data $132q1$ that is new data is made by the host computer 300 to the storage apparatus 100. Furthermore, it is assumed that, in response to the access request for writing the data $132q1$, the access unit 102 is scheduled to write, on the basis of the Small Write method, the data $132q1$ and a new parity that is parity after update based on the data $132q1$ into the storage devices $120c$ to $120f$.

When accepting the access request for writing the data $132q1$ from the host computer 300, the access unit 102 in the storage apparatus 100 outputs to the host computer 300 an access completion report for reporting the completion of writing data.

Next, in order to write, on the basis of the Small Write method, the data $132q1$ that is new data accepted from the host computer 300, the access unit 102 reads out data $132p1$, which is existing data corresponding to the data $132q1$, and data $132p4$ that is existing parity, from the stripe $1202p1$ that is a stripe into which the data $132q1$ is to be written. Here, it is assumed that the access unit 102 has detected a read error in the readout of the data $132p1$ from the stripe $1202p1$, and has failed to perform a readout operation before a write operation.

Next, when the access unit 102 has failed to perform an readout operation before the writing of the data $132q1$, the access unit 102 reads out data stored in another storage device included in the stripe $1202p1$, in order to restore the data of the stripe $1202p1$. Accordingly, the access unit 102 can detect the unformatted-state identifier (data $132p2$ or $132p3$ in FIG. 13) of the stripe $1202p1$ on the basis of pieces of data $132p2$ and $132p3$ read out from the other storage devices.

Here, a stripe $1202q1$ is a storage area in which the unformatted-state identifier has been stored, and the pieces of existing data $132p1$, $132p2$, $132p3$, and $132p4$ are not pieces of normal data. Therefore, it is difficult to use these pieces of data for calculating new parity on the basis of the Small Write method. Accordingly, in FIG. 13, even if it is scheduled to write, on the basis of the Small Write method, the data $132q1$ into the stripe $1202p1$ from which the unformatted-state identifier has been detected, the Small Write method is not performed.

In this case, as illustrated in FIG. 14, in the same way as the Bandwidth Write method, the access unit 102 creates pieces of data $132q2$ and $132q3$ that are pieces of format data to be written into storage areas not to be updated on the basis of the writing for the data $132q1$, the storage areas being located in a stripe into which the data $132q1$ that is new data accepted from the host computer 300 is to be written. Next, the access unit 102 performs an XOR operation among the pieces of data $132q1$ to $132q3$, and calculates data $132q4$ that is new parity.

Next, the access unit 102 writes the pieces of data $132q1$ to $132q4$ into the stripe $1202p1$ that is an unformatted-state identifier area extending to the storage devices $120c$ to $120f$. Accordingly, the pieces of data $132q1$ to $132q3$ that are pieces of new data and the data $132q4$ that is the parity of the new data are written as illustrated in the stripe $1202q1$, and the logical formatting of the stripe $1202q1$ is completed. In addition, while, in FIGS. 13 and 14, a case in which a read error due to the loss of data in the stripe $1202p1$ occurs has been described, the same operation is also performed when the unformatted-state identifier has been written into the stripe $1202p1$ and the access unit 102 detects that the read data $132p4$ is neither the unformatted-state identifier nor normal data.

Figure 15:
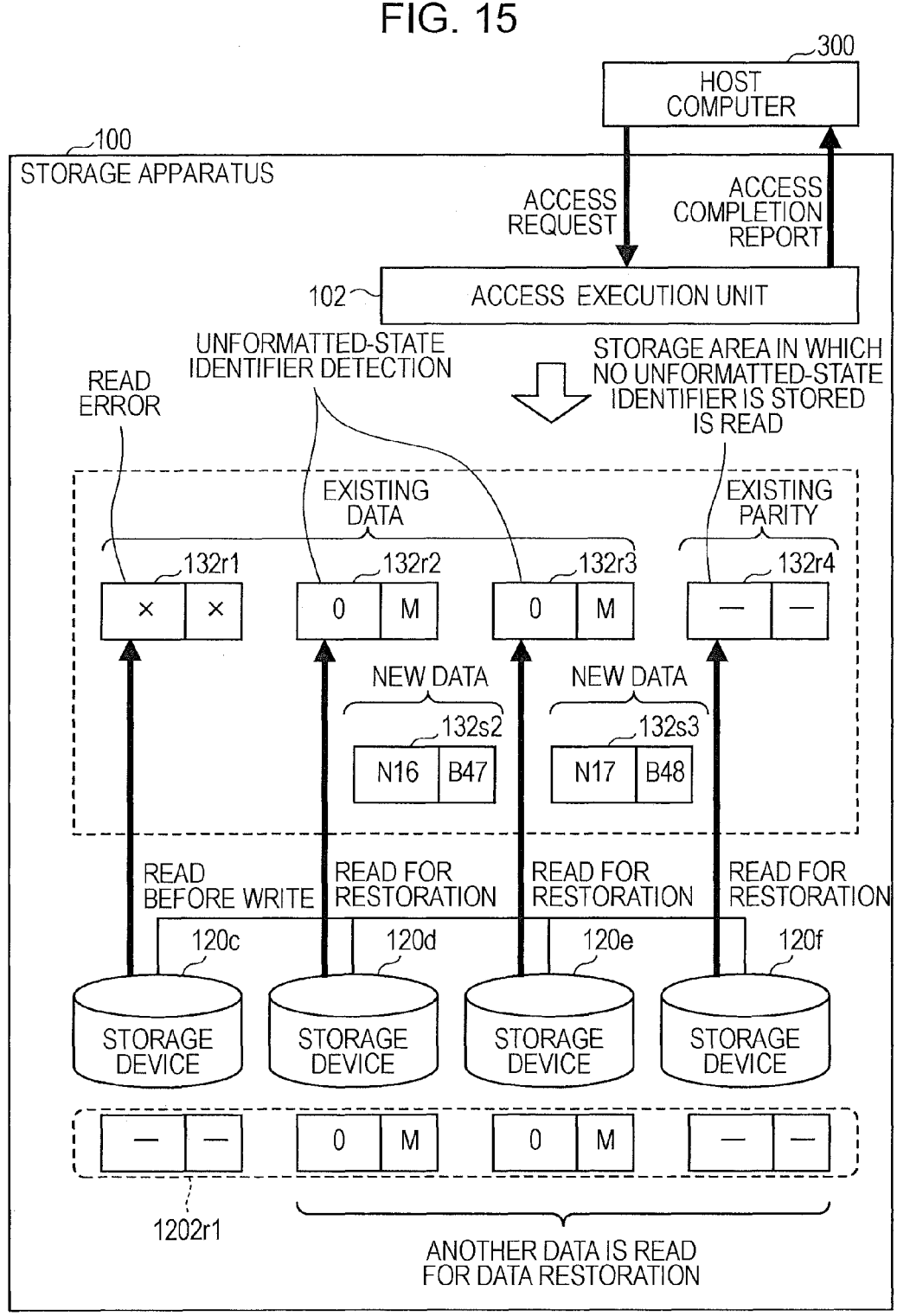
FIG. 15 is a diagram illustrating an operation performed when a read error occurs in a case where data according to the second embodiment is written using the Read Bandwidth Write method.
Figure 16:
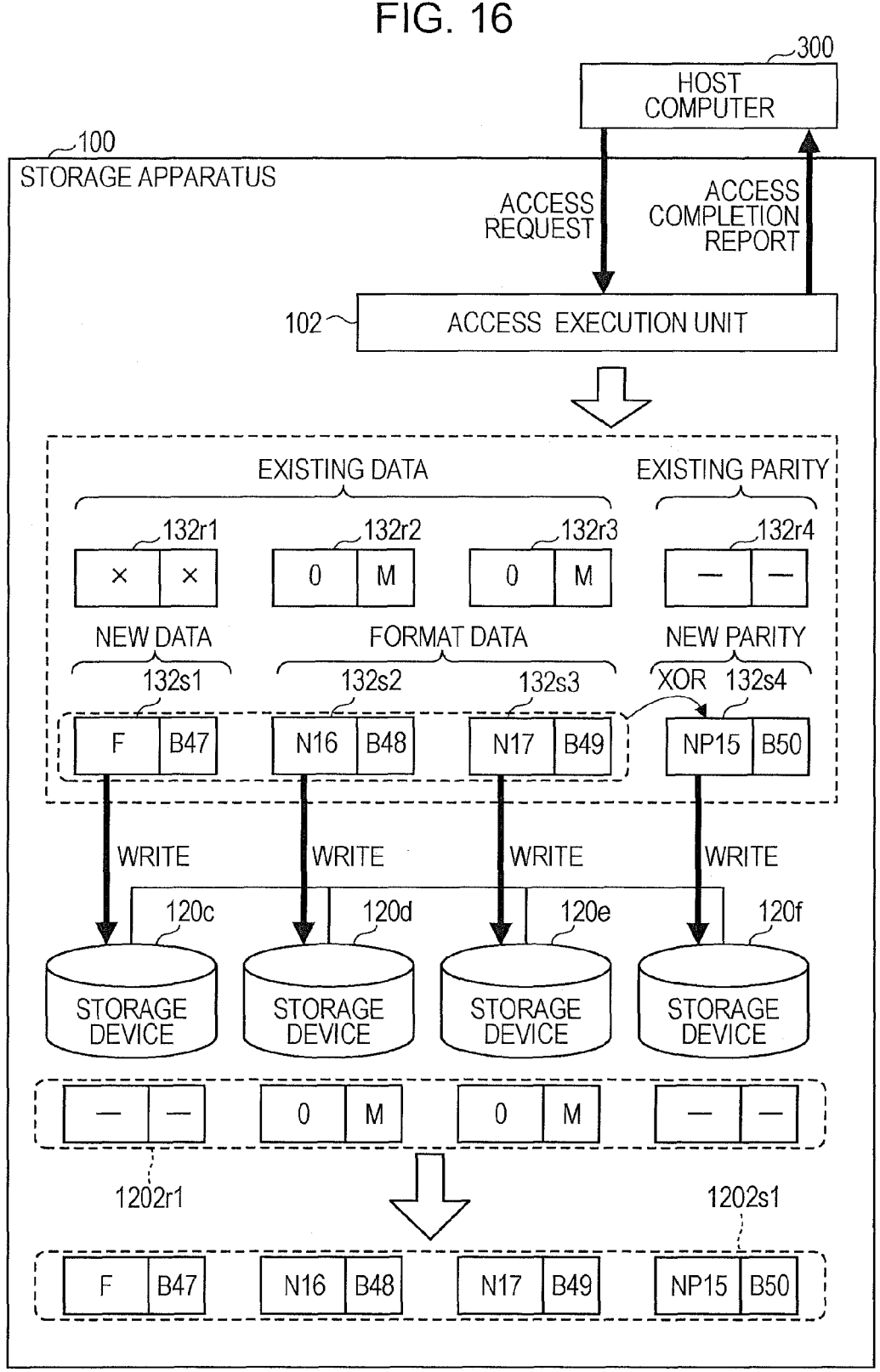
FIG. 16 is a diagram illustrating an operation performed when a read error occurs in a case where data according to the second embodiment is written using the Read Bandwidth Write method.

FIGS. 15 and 16 are diagrams illustrating an operation performed when a read error occurs in a case where data according to the second embodiment is written using the Read Bandwidth Write method. With reference to FIGS. 15 and 16, an operation will be described that is performed when a read error occurs in a case where data is written in the storage apparatus 100 according to the present embodiment using the Read Bandwidth Write method.

Here, as illustrated in FIG. 15, it is assumed that the unformatted-state identifier has been written into a stripe $1202r1$ that is a stripe into which data for an access request is to be written, the stripe $1202r1$ extending to storage devices $120c$ to $120f$ included in the storage apparatus 100. In addition, it is assumed that an access request for writing pieces of data $132s2$ and $132s3$ that are pieces of new data is made by the host computer 300 to the storage apparatus 100. Furthermore, it is assumed that, in response to the access request for writing the pieces of data $132s2$ and $132s3$, the access unit 102 is scheduled to write, on the basis of the Read Bandwidth Write method, the pieces of data $132s2$ and $132s3$ and a new parity that is parity after update based on the pieces of data $132s2$ and $132s3$ into the storage devices $120c$ to $120f$.

When accepting the access request for writing the pieces of data $132s2$ and $132s3$ from the host computer 300, the access unit 102 in the storage apparatus 100 outputs to the host computer 300 an access completion report for reporting the completion of writing data.

Next, in order to write, on the basis of the Read Bandwidth Write method, the pieces of data $132s2$ and $132s3$ that are pieces of new data accepted from the host computer 300, the access unit 102 reads out data $132r1$ that is existing data not to be updated, from the stripe $1202r1$ that is a stripe into which the pieces of data $132s2$ and $132s3$ are to be written. Here, it is assumed that the access unit 102 has detected a read error in the readout of the data $132r1$ from the stripe $1202r1$, and has failed to perform a readout operation before a write operation.

Next, when the access unit 102 has failed to perform an readout operation before the writing of the pieces of data $132s2$ and $132s3$, the access unit 102 reads out pieces of data $132r2$, $132r3$, and $132r4$ stored in another storage device included in the stripe 1202r1, in order to restore the data of the stripe 1202r1. Accordingly, the access unit 102 can detect the unformatted-state identifier (data 132r2 or 132r3 in FIG. 15) of the stripe 1202r1 on the basis of the pieces of data 132r2, 132r3, and 132r4 read out from the other storage devices.

Here, a stripe 1202s1 is a storage area in which the unformatted-state identifier has been stored, and the pieces of existing data 132r1, 132r2, 132r3, and 132r4 are not pieces of normal data. Therefore, it is difficult to use these pieces of data for calculating new parity on the basis of the Read Bandwidth Write method. Accordingly, in the examples illustrated in FIGS. 15 and 16, even if it is scheduled to write, on the basis of the Read Bandwidth Write method, the pieces of data 132s2 and 132s3 into the stripe 1202r1 from which the unformatted-state identifier has been detected, the Read Bandwidth Write method is not performed.

In this case, as illustrated in FIG. 16, in the same way as the Bandwidth Write method, the access unit 102 creates data 132s1 that is format data to be written into a storage area not to be updated on the basis of the writing of the pieces of data 132s2 and 132s3, the storage areas being located in a stripe into which the pieces of data 132s2 and 132s3 that are pieces of new data accepted from the host computer 300 are to be written. Next, the access unit 102 performs an XOR operation among the pieces of data 132s1 to 132s3, and calculates data 132s4 that is new parity.

Next, the access unit 102 writes the pieces of data 132s1 to 132s4 into the stripe 1202r1 that is an unformatted-state identifier area into which the unformatted-state identifier has been written. Accordingly, the pieces of data 132s1 to 132s3 that are pieces of new data and the data 132s4 that is the new parity of the new data are written as illustrated in the stripe 1202s1, and the logical formatting of the stripe 1202s1 is completed. In addition, while, in FIGS. 15 and 16, a case in which a read error due to the loss of data in the stripe 1202r1 occurs has been described, the same operation is also performed when the unformatted-state identifier has been written into the stripe 1202r1 and the access unit 102 detects that the read data 132r1 is neither the unformatted-state identifier nor normal data.

Figure 17:
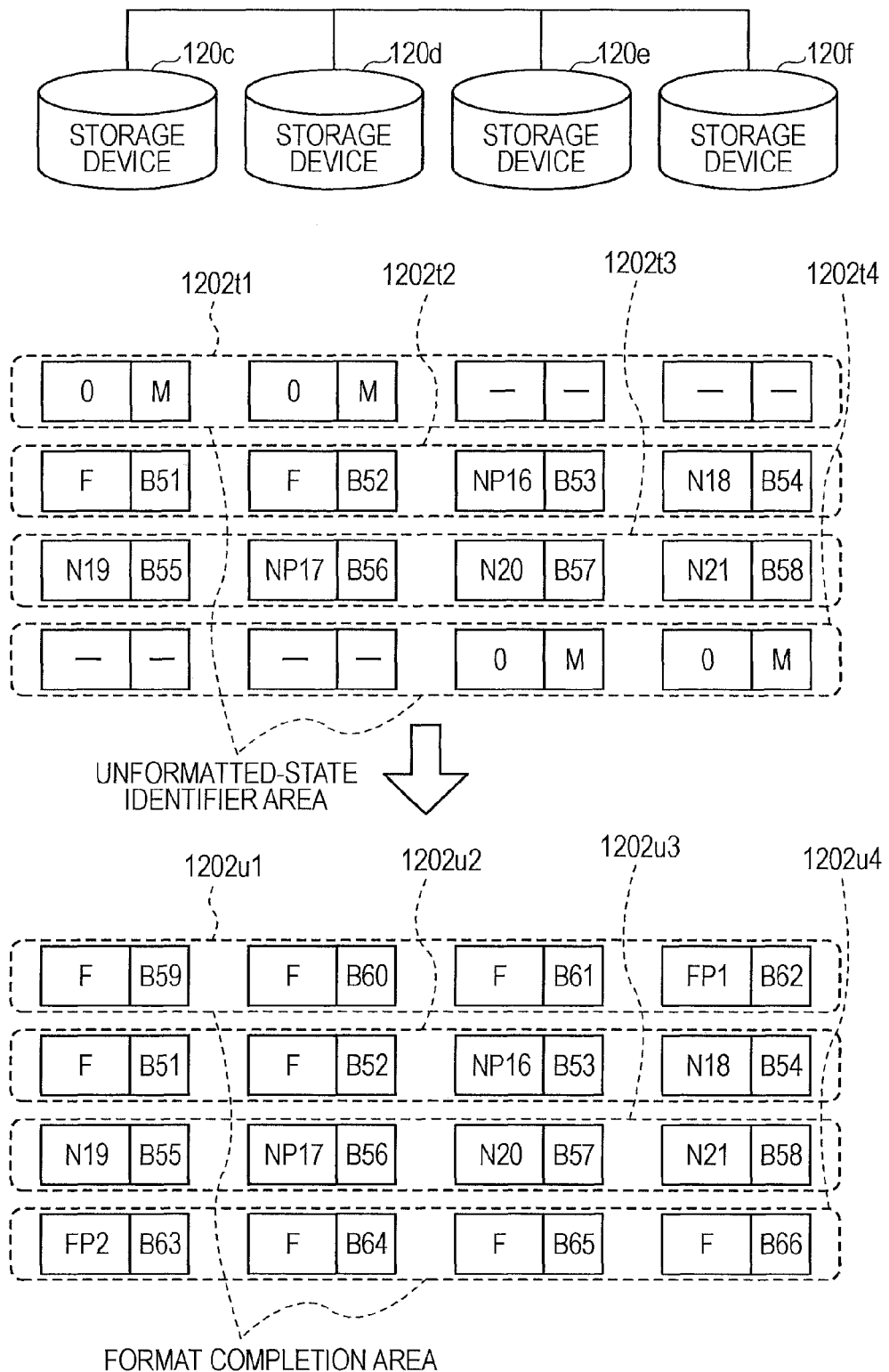
FIG. 17 is a diagram illustrating an operation performed when logical formatting is executed on an area from which the unformatted-state identifier according to the second embodiment is detected.

FIG. 17 is a diagram illustrating an operation performed when logical formatting is executed on an area from which the unformatted-state identifier according to the second embodiment is detected. As described with reference to FIGS. 8 and 9, in the storage apparatus 100 according to the present embodiment, the unformatted-state identifiers are written into the storage devices 120c to 120f included in the RAID, at the time of initializing. After that, while, in the storage apparatus 100, data is written into an unformatted-state identifier area into which the unformatted-state identifier has been written, in response to an access request made by the host computer 300 for writing data, it turns out that the unformatted-state identifier remains in a stripe for which no access has been performed.

On the other hand, in FIG. 17, by performing a disk patrol operation in which a trigger different from an access request made by the host computer 300 causes a read and write operation to be performed on all storage areas in the storage devices 120c to 120f, and hence the functions of the storage devices 120c to 120f are checked, it is checked whether or not there is the unformatted-state identifier in a stripe. As the result of the check, format data is written into a stripe from which the unformatted-state identifier has been detected, and hence logical formatting for the unformatted-state identifier area is completed.

With reference to FIG. 17, the operation will be described that is, as described above, performed when logical formatting is executed on an area from which the unformatted-state identifier is detected by the storage apparatus 100. As illustrated in FIG. 17, it is assumed that, in the storage apparatus 100, stripes 1202t1 to 1202t4 including storage areas in the storage devices 120c to 120f are stored as a state before the disk patrol operation.

The stripe 1202t1 (data: "0"; BCC: "M", data: "0"; BCC: "M", data: "-"; BCC: "-", and data: "-"; BCC: "-") and the 1202t4 (data: "-"; BCC: "-", data: "-"; BCC: "-", data: 0; BCC: "M", and data: "0"; BCC: "M") are unformatted-state identifier areas into which the unformatted-state identifiers are written. In addition, pieces of data for an access request made by the host computer 300 or pieces of format data are written into the stripe 1202t2 (data: "F"; BCC: "B51", data: "F"; BCC: "B52", data: "NP16"; BCC: "B53", and data: "N18"; BCC: "54") and the 1202t3 (data: "N19"; BCC: "B55", data "NP17"; BCC: "B56", data "NP20"; BCC: "B57", and data: "N21"; BCC: "58").

While, in the present embodiment, the detail of the operation will be described later in an unformatted-state identifier detection processing operation illustrated in FIG. 20, the access unit 102 performs the disk patrol operation when a format data write completion flag indicates invalidity and the unformatted-state identifier detection processing operation is performed after the execution of the unformatted-state identifier write processing operation. In the disk patrol operation, the access unit 102 checks each storage area in the storage apparatus 100 and detects the unformatted-state identifier from each stripe, with respect to the stripes 1202t1 to 1202t4. In addition, the access unit 102 writes format data into a stripe from which the unformatted-state identifier has been detected. Individual stripes in the storage devices 120c to 120f subjected to the disk patrol operation are illustrated in stripes 1202u1, 1202u2, 1202u3, and 1202u4.

Here, by performing the disk patrol operation, format data is written into the stripe 1202t1 that has been an unformatted-state identifier area, and hence the stripe 1202t1 becomes a format completion area as illustrated in the stripe 1202u1 (data: "F"; BCC: "B59, data: "F"; BCC: "B60", data: "F"; BCC: "B61", and data: "FP1"; BCC: "B62"). In the same way, by performing the disk patrol operation, format data is written into the stripe 1202t4 that has been an unformatted-state identifier area, and hence the stripe 1202t4 becomes a format completion area as illustrated in the stripe 1202u4 (data: "FP2"; BCC: "B63", data: "F"; BCC: "B64", data: "F"; BCC: "B65", and data: "F"; BCC: "B66"). On the other hand, since data for a write access request made by the host computer 300 has been already written into the stripes 1202u2 and 1202u3, and no unformatted-state identifier has been written into the stripes 1202u2 and 1202u3, format data is not written into the stripes 1202u2 and 1202u3, and hence the storage contents of the stripes 1202u2 and 1202u3 do not change before and after the execution of the disk patrol operation.

Next, when the checking of all stripes in the storage apparatus 100 has been completed on the basis of the disk patrol operation, the access unit 102 puts a format data write completion flag into a valid state. When the format data write completion flag is in a valid state, the access unit 102 does not execute the disk patrol operation.

In this way, in the storage apparatus 100 according to the present embodiment, on the basis of the disk patrol operation, format data can be written into a stripe for which the host computer 300 has not made an access request yet. In addition, it is desirable to perform the disk patrol operation on the basis of an operation or the like in which the statistical data of the frequency of access is acquired and hence the frequency of access is predicted, when the frequency of access from the host computer 300 to the storage devices 120c to 120f decreases in the storage apparatus 100. Accordingly, while the concentration of loads of the processing operation performed in the storage apparatus 100 is avoided, the disk patrol processing can be executed.

In addition, since the unformatted-state identifier can be prevented from being detected when the host computer 300 makes a write access request, the load of the processing operation performed when the host computer 300 makes a write access request can also be reduced.

In addition, when the format data write completion flag is in a valid state, it can be determined that no format incompletion area and no unformatted-state identifier area remain in stripes in the storage apparatus 100, and hence the execution of the disk patrol operation becomes unnecessary. Therefore, the load of the processing operation performed in the storage apparatus 100 can also be reduced.

Figure 18:
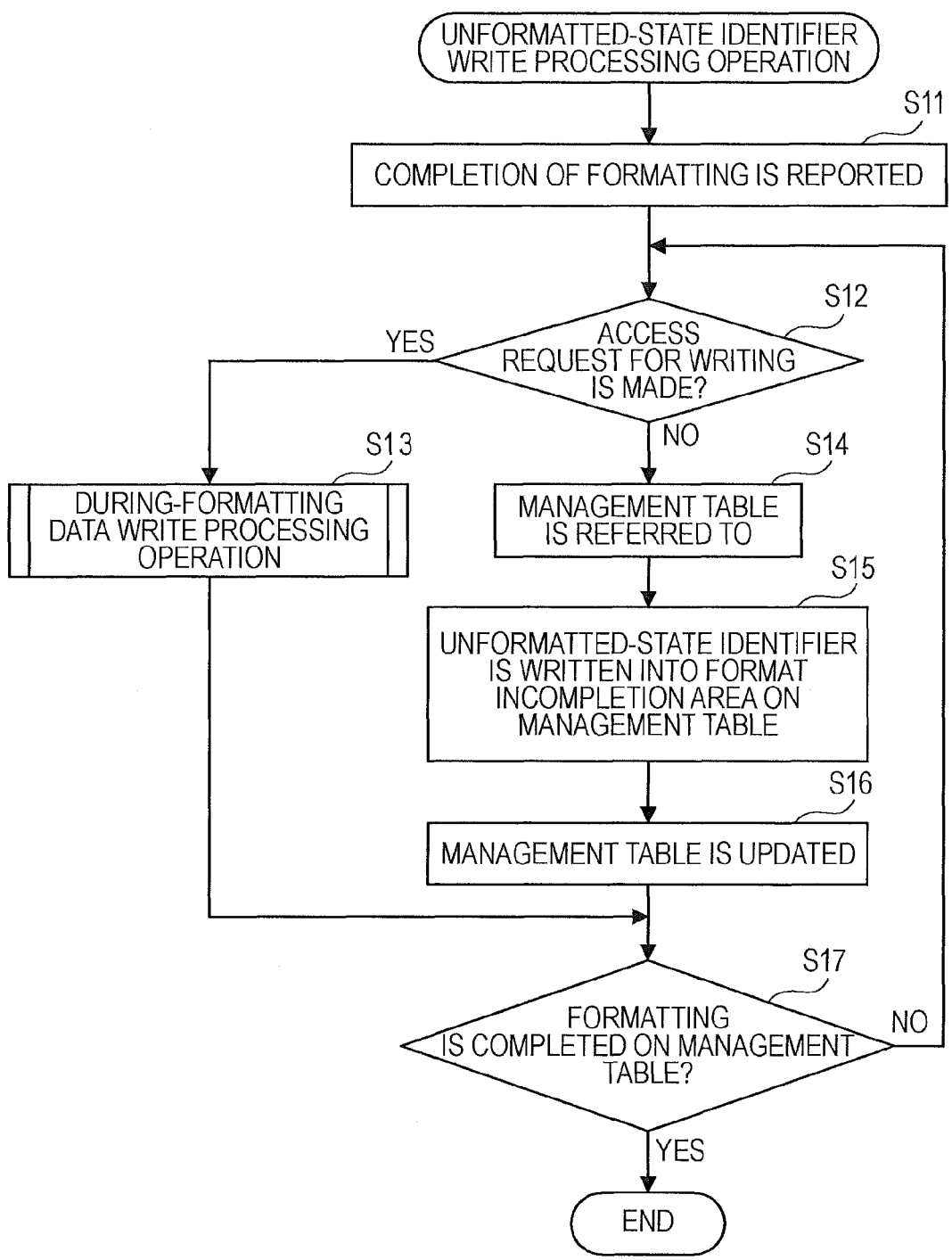
FIG. 18 is a flowchart illustrating a procedure of an unformatted-state identifier write processing operation according to the second embodiment.

FIG. 18 is a flowchart illustrating the procedure of an unformatted-state identifier write processing operation according to the second embodiment. When the storage devices 120c to 120f are connected, the storage apparatus 100 according to the present embodiment executes the unformatted-state identifier write processing operation for writing the unformatted-state identifiers into storage areas in the storage devices 120c to 120f, at the time of logical formatting performed for initializing the storage devices 120c to 120f. Hereinafter, the unformatted-state identifier write processing operation illustrated in FIG. 18 will be described in the order of the step numbers of the flowchart.

In step S11, the access unit 102 reports the completion of formatting to the format control unit 101 that made a format request.

In step S12, the access unit 102 determines whether or not the host computer 300 makes an access request for writing data into a stripe extending to the storage devices 120c to 120f. If the host computer 300 makes the write access request (step S12: YES), the processing operation proceeds to step S13. On the other hand, if the host computer 300 makes no write access request (step S12: NO), the processing operation proceeds to step S14.

In step S13, when the host computer 300 makes the write access request, the access unit 102 executes a during-formatting data write processing operation (the detail thereof will be described later with reference to FIG. 19) in which data for the write access request is written into a stripe. After that, the processing operation proceeds to step S17.

In step S14, the access unit 102 refers to the management table stored in the management information storage unit 151, and acquires one stripe that is a format incompletion area into which neither format data nor an unformatted-state identifier is written.

In step S15, the access unit 102 writes an unformatted-state identifier into a stripe from among storage areas in the storage devices 120c to 120f, the stripe being stored in the management table referred to in Step S14 and a format incompletion area that is a storage area the logical formatting of which has not been completed. At this time, as described with reference to FIG. 9, the access unit 102 writes the unformatted-state identifiers into storage areas in units of stripes.

In step S16, regarding, as a logically formatted storage area, the storage area of the stripe into which the unformatted-state identifier has been written, the access unit 102 updates the management table.

In step S17, the access unit 102 determines whether or not the logical formatting of all storage areas in the storage devices 120c to 120f has been completed on the management table. When the logical formatting has been completed on the management table with respect to the all storage areas (step S17: YES), the processing operation is terminated. On the other hand, when an area in which the logical formatting is not performed remains on the management table (step S17: NO), the processing operation proceeds to step S13.

Figure 19:
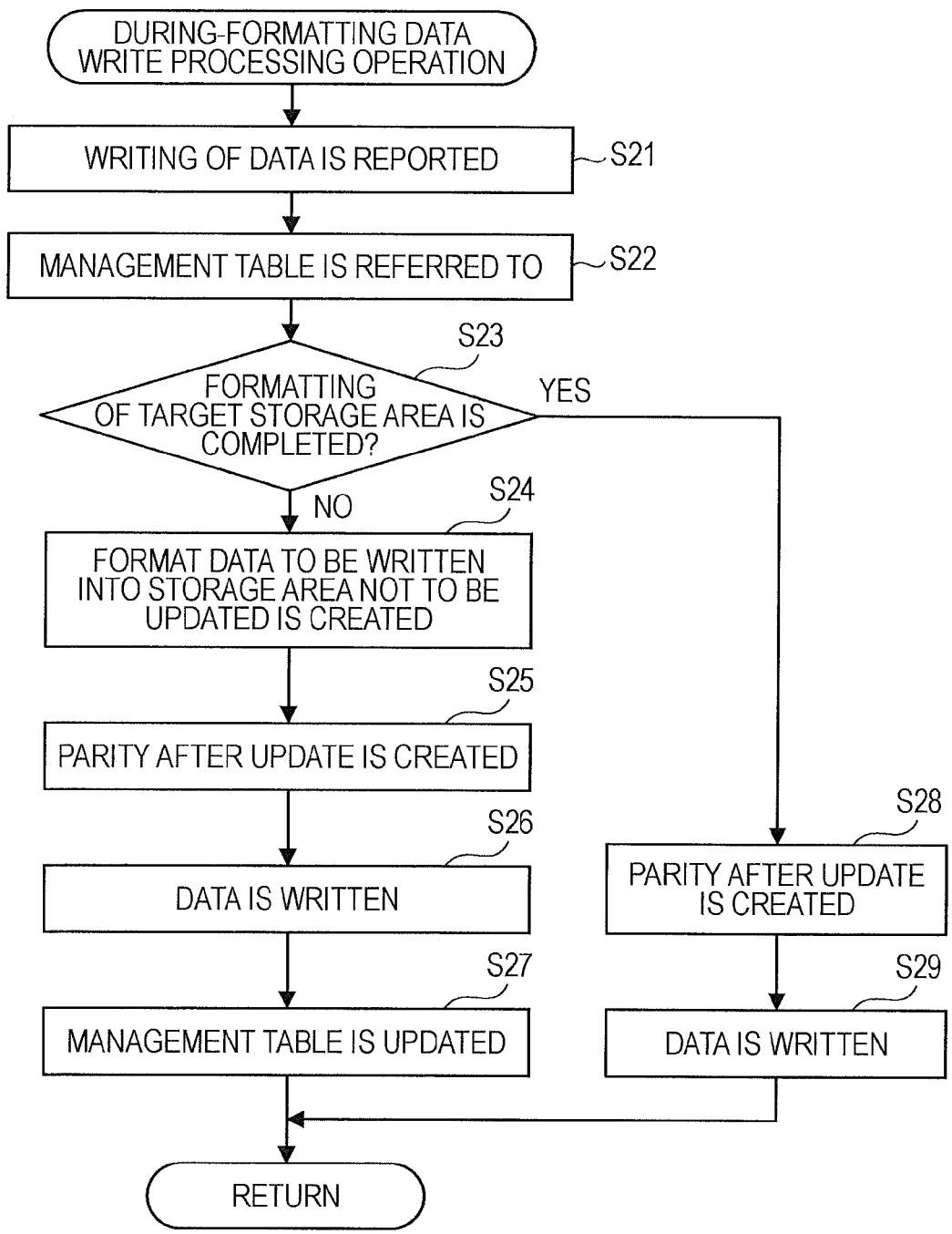
FIG. 19 is a flowchart illustrating a procedure of a during-formatting data write processing operation according to the second embodiment.

FIG. 19 is a flowchart illustrating the procedure of a during-formatting data write processing operation according to the second embodiment. When an access request is made during the execution of the unformatted-state identifier write processing operation, the storage apparatus 100 according to the present embodiment executes the during-formatting data write processing operation in which data for the access request is written into a storage area in a stripe extending to the storage devices 120c to 120f. In addition, if no access request for writing data is made by the host computer 300 during the execution of the unformatted-state identifier write processing operation described above with reference to FIG. 18, the during-formatting data write processing operation is not executed. Hereinafter, the during-formatting data write processing operation illustrated in FIG. 19 will be described in the order of the step numbers of the flowchart.

In step S21, the access unit 102 reports the completion of writing of data to the host computer 300 that has made an access request for writing data, at a stage when data for the access request has been written into a cache memory (for example, the cache memory 112a).

In step S22, the access unit 102 refers to the management table stored in the management information storage unit 151, and acquires one stripe extending to the storage devices 120c to 120f.

In step S23, the access unit 102 determines whether or not the logical formatting of a storage area that is a write target corresponding to the access request has been completed on the management table. When the logical formatting of the storage area that is a write target has been completed on the management table (step S23: YES), the processing operation proceeds to step S28. On the other hand, when the logical formatting of the storage area that is a write target has not been completed on the management table (step S23: NO), the processing operation proceeds to step S24.

In step S24, the access unit 102 creates format data to be written into a storage area into which no data is written with respect to the access request, thereby the storage not being updated.

In step S25, the access unit 102 creates parity used after the stripe is updated in response to the access request. At this time, using one of the Bandwidth Write method, the Read Bandwidth Write method, and the Small Write method, the access unit 102 creates the parity after the update. In addition, using data, necessary for the method to be used, from among data after the update at the access request, the data of the stripe before the update and the parity of the stripe before the update, and the format data created in step S24, the access unit 102 creates the parity after the update.

In step S26, the access unit 102 writes the data for the access request, the format data created in step S24, and the parity after the update, created in step S25, into the storage areas in the stripe that is the target of the access request, the stripe extending to the storage devices 120c to 120f.

In step S27, regarding, as a logically formatted storage area, the storage area of the stripe into which data has been written in step S26, the access unit 102 updates the management table. After that, the processing operation returns to the unformatted-state identifier write processing.

In step S28, the access unit 102 creates parity used after the update of the stripe for the access request.

In step S29, the access unit 102 writes the data for the access request and the parity after the update, created in step S28, into the storage area in the stripe that is the target of the access request, the stripe extending to the storage devices 120c to 120f. After that, the processing operation returns to the unformatted-state identifier write processing.

Figure 20:
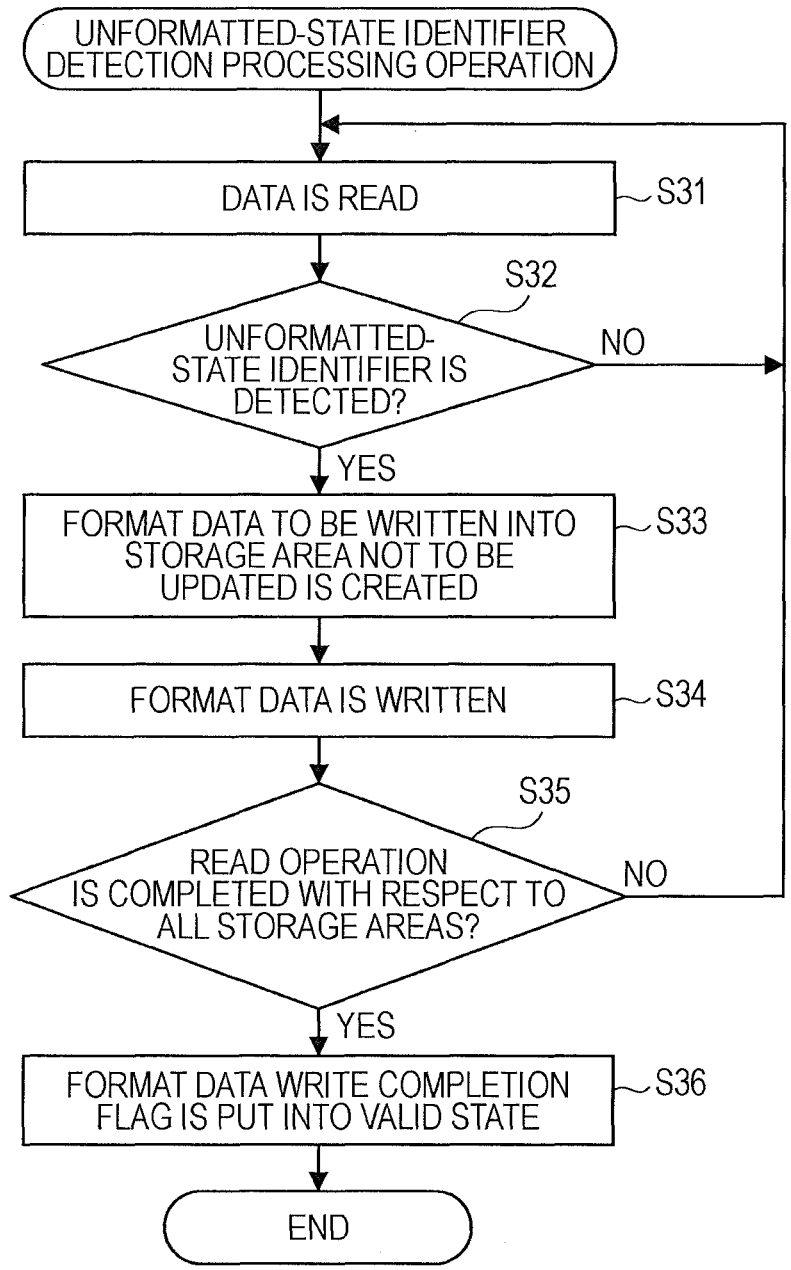
FIG. 20 is a flowchart illustrating a procedure of an unformatted-state identifier detection processing operation according to the second embodiment.

FIG. 20 is a flowchart illustrating the procedure of the unformatted-state identifier detection processing operation according to the second embodiment. In the storage apparatus 100 according to the present embodiment, after the unformatted-state identifier write processing operation has been completed, a trigger different from an access request made by the host computer 300, for example, the decrease of the frequency of access to the storage devices 120c to 120, or the like, causes the unformatted-state identifier detection processing operation to be executed. The unformatted-state identifier detection processing operation is a processing operation in which a stripe into which the unformatted-state identifier indicating the in-execution of logical formatting is written is detected and the disk patrol processing operation for the execution of logical formatting is performed on storage areas in the detected stripe. In the storage apparatus 100 according to the present embodiment, when the format data write completion flag is in an invalid state and the unformatted-state identifier detection processing operation is to be executed after the execution of the unformatted-state identifier write processing operation is completed, an arbitrary trigger, for example, the elapse of a predetermined time, or the like, causes the unformatted-state identifier detection processing operation to be executed. The unformatted-state identifier detection processing operation illustrated in FIG. 20 will be described in the order of the step numbers of the flowchart.

In step S31, the access unit 102 sequentially reads out, in units of stripes, stored data from storage areas included in stripes extending to the storage devices 120c to 120f.

In step S32, the access unit 102 determines whether or not the unformatted-state identifier is detected from storage areas in the stripe from which data has been read out in step S31. When the unformatted-state identifier is detected from storage areas in the stripe (step S32: YES), the processing operation proceeds to step S33. On the other hand, when the unformatted-state identifier is not detected from storage areas in the stripe (step S32: NO), the processing operation proceeds to step S31.

In step S33, the access unit 102 creates format data to be written into a storage area in the strip from which the unformatted-state identifier has been detected in step S32.

In step S34, the access unit 102 writes the format data created in step S33 into the storage area in the strip from which the unformatted-state identifier has been detected in step S32.

In step S35, the access unit 102 determines whether or not the data read operation performed in step S31 has been completed with respect to all storage areas in the storage devices 120c to 120f. When the data read operation has been completed with respect to the all storage areas (step S35: YES), the processing operation proceeds to step S36. On the other hand, when the data read operation has not been completed with respect to the all storage areas step S35: NO), the processing operation proceeds to step S31.

In step S36, the access unit 102 puts the format data write completion flag into a valid state. After that, the processing operation is terminated. FIGS. 21 to 23 are flowcharts illustrating the procedure of a data write processing operation executed after the completion of writing of an unformatted-state identifier according to the second embodiment. In the storage apparatus 100 according to the present embodiment, in a case in which an access request is made after the termination of the unformatted-state identifier write processing, when, using the Read Bandwidth Write method and the Small Write method, data for the access request is written into a storage area in a stripe extending to the storage devices 120c to 120f, the data write processing operation executed after the completion of writing of an unformatted-state identifier is executed. Hereinafter, the data write processing operation executed after the completion of writing of an unformatted-state identifier, illustrated in FIGS. 20 to 23, will be described in the order of the step numbers of the flowchart.

In step S41, the access unit 102 transmits a data-write report for reporting the completion of writing of data to the host computer 300 that has made an access request for writing data, at a stage when data for the access request has been written into a cache memory (for example, the cache memory 112a), and reads out data from a storage area that is a write destination.

In step S42, the access unit 102 determines whether or not the reading of data succeeds in step S41. When the reading of data from the write destination succeeds (step S42: YES), the processing operation proceeds to step S43. On the other hand, when the reading of data from the write destination does not succeed (step S42: NO), the processing operation proceeds to step S51.

In step S43, the access unit 102 determines whether or not the BCC of the data read out in step S41 is correct. When the BCC is correct (step S43: YES), the processing operation proceeds to Step S44. On the other hand, when the BCC is not correct (step S43: NO), the processing operation proceeds to step S46.

In step S44, the access unit 102 creates parity used after the stripe for which the access request is made is updated.

In step S45, the access unit 102 writes the data for the access request and the parity after the update, created in step S44, into the storage areas in the storage devices 120c to 120f included in the stripe that is the target of the access request. Here, in the present embodiment, in any of the Read Bandwidth Write method and the Small Write method, one of the data for the access request and format data is written into all storage areas included in one stripe. Accordingly, the data structure of the stripe becomes the same as that in a case in which data is written after the logical formatting of the stripe. After that, the processing operation is terminated.

In step S46, the access unit 102 determines whether or not the unformatted-state identifier is detected from storage areas in the stripe from which data has been read out in step S41. When the unformatted-state identifier is detected from storage areas in the stripe (step S46: YES), the processing operation proceeds to step S47. On the other hand, when the unformatted-state identifier is not detected from storage areas in the stripe (step S46: NO), the processing operation proceeds to step S51.

In step S47, the access unit 102 creates format data to be written into a storage area into which no data is written with respect to the access request, thereby the storage area not being updated.

In step S48, the access unit 102 creates parity used after the stripe for the access request is updated.

In step S49, the access unit 102 writes the data for the access request, the format data created in step S47, and the parity after the update, created in step S48, into the storage areas in the storage devices 120c to 120f included in the stripe that is the target of the access request. After that, the processing operation is terminated.

In step S51, the access unit 102 transmits a data-write report to the host computer 300 that has made an access request for writing data, at a stage when data for the access request is written into a cache memory (for example, the cache memory 112a), and reads out data from a storage area that is a write destination, the storage area being included in a storage device different from the storage device from which data has been read out in step S41.

In step S52, the access unit 102 determines whether or not the reading of data succeeds in step S51. When the reading of data succeeds (step S52: YES), the processing operation proceeds to step S53. On the other hand, when the reading of data does not succeed (step S52: NO), the processing operation proceeds to step S61.

In step S53, the access unit 102 determines whether or not the BCC of the data read out in step S51 is correct. When the BCC is correct (step S53: YES), the processing operation proceeds to step S54. On the other hand, when the BCC is not correct (step S53: NO), the processing operation proceeds to step S56.

In step S54, the access unit 102 creates parity used after the stripe for which the access request is made is updated.

In step S55, the access unit 102 writes the data for the access request and the parity after the update, created in step S54, into the storage areas in the storage devices 120c to 120f included in the stripe that is the target of the access request. After that, the processing operation is terminated.

In step S56, the access unit 102 determines whether or not the unformatted-state identifier is detected from storage areas in the stripe from which data has been read out in step S51. When the unformatted-state identifier is detected (step S56: YES), the processing operation proceeds to step S57. On the other hand, when the unformatted-state identifier is not detected (step S56: NO), the processing operation proceeds to step S61.

In step S57, the access unit 102 creates format data to be written into a storage area into which no data is written with respect to the access request, thereby the storage area not being updated.

In step S58, the access unit 102 creates parity used after the stripe for the access request is updated.

In step S59, the access unit 102 writes the data for the access request, the format data created in step S57, and the parity after the update, created in step S58, into the storage areas in the storage devices 120c to 120f included in the stripe that is the target of the access request. After that, the processing operation is terminated.

In step S61, the access unit 102 executes an error processing operation performed when data fails to be read out from a stripe from which data has been read out in step S41 and step S51. In this case, for example, if the storage apparatus 100 is a RAID 5, the error processing operation is performed assuming that a disk array is out of order. In addition, if the storage apparatus 100 is a RAID 6, it is possible to further try to read the data of a different storage device. After that, the processing operation is terminated.

In addition, while, in the embodiment, a case is described in which the present invention is applied to a logical format, the present invention is not limited to the example but the present invention can also be applied to a physical format. In this way, in the storage apparatus 100 according to the second embodiment, when the host computer 300 makes an access request for writing data, it can be determined, on the basis of the unformatted-state identifier, whether or not the logical formatting of a stripe that is a write destination has been completed. In access to a storage medium the logical formatting of which is uncompleted, the increase of the load of a storage medium can be restrained and the duration of time before completing the formatting of the storage medium can be reduced.

In addition, by setting the number of written unformatted-state identifiers to the number of redundancies of RAID+1, compared with a case in which format data is written into all storage devices, a necessary time at the time of the initial settings of storage devices can be reduced, and loads at the time of the initial settings of the storage devices can be reduced.

In addition, when, during a write operation for the unformatted-state identifier, the host computer 300 makes an access request for writing data, data for the access request and format data are written into a stripe in one processing operation. Therefore, the number of write processing operations can be reduced.

In addition, the above-mentioned processing operations illustrated in individual embodiments can be realized by causing a computer to execute a predetermined program. In that case, a program in which the content of a processing operation to be realized is described is provided. The program in which the content of a processing operation is described may be recorded in a computer-readable recording medium. Examples of the computer-readable recording medium include a magnetic recording apparatus, an optical disk, a magneto-optical recording medium, and a semiconductor memory. Examples of the magnetic recording apparatus include a hard disk apparatus, a flexible disk (FD), a magnetic tape (MT), and the like. Examples of the optical disk include a digital versatile disc (DVD), a DVD-RAM, a compact disc-read only memory (CD-ROM), a CD-Recordable (CD-R), a CD-Re-Writable (CD-RW), and the like. Examples of the magneto-optical recording medium include a magneto-optical disk (MO) and the like.

When programs are distributed, portable recording media such as DVDs, CD-ROMs, and the like in which the programs are recorded are marketed, for example. In addition, the programs may be stored in storage devices in server computers, and the programs may be transferred from the server computers to other computers through a network.

For example, a computer that executes a program stores in a storage apparatus therein the program stored in a portable recording medium or the program transferred from the server computer. In addition, the computer reads out the program from the storage device therein, and executes a processing operation according to the program. In addition, the computer may directly read out the program from the portable recording medium, and may execute a processing operation according to the program. In addition, every time the program is transferred from the server computer, the computer may execute a processing operation according to the received program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage apparatus comprising:
a plurality of storage media including each storage area, wherein a stripe is set extending over the storage area of the plurality of storage media:
an access unit that writes a format data into the storage area, wherein when the plurality of storage media are formatted, the access unit writes an unformatted-state identifier indicating incompletion of formatting into at least a portion of storage area to be included in the stripe, or when the storage area to be included in the stripe is accessed for writing new data, the access unit reads out existing data stored in the storage area included in the stripe to be accessed; and
when the unformatted-state identifier is detected from the existing data that has been read out, the access unit writes the new data or the format data to be written by formatting into the storage area.

2. The storage apparatus according to claim 1, wherein
in the case the new data is written into the stripe to be accessed, the access unit writes the new data into the storage area included in the stripe; and
in the case the new data is not written, into the stripe to be accessed, the access unit writes the format data into the storage area included in the stripe.

3. The storage apparatus according to claim 1, wherein
when the unformatted-state identifier is detected from the existing data that has been read out, the access unit writes the new data into the storage area, into which the new data is to be written, and writes the format data into another storage area included in the stripe to be accessed.

4. The storage apparatus according to claim 1, wherein
the access unit sequentially reads out storage contents of the storage area in the storage media; and
when the unformatted-state identifier is detected from the stripe to be accessed, the access unit writes the format data into the stripe to be accessed.

5. The storage apparatus according to claim 1, wherein
when the access unit updates a portion of the existing data stored in the stripe with the new data, the access unit reads out the existing data not to be updated with the new data from the stripe, calculates a new parity that is a parity data after update on the basis of the new data and the existing data that has been read out, updates the existing data to be updated with the new data, and updates existing parity with the new parity.

6. The storage apparatus according to claim 1, wherein
when the access unit updates, a portion of existing data stored in the stripe, the access unit reads out the existing data to be updated with the new data and existing parity that is parity data before update, calculates the new parity that is parity data after update on the basis of the new data and the existing data that has been read out, updates the existing data to be updated with the new data, the existing data being stored in the stripe, and updates the existing parity with the new parity.

7. The storage apparatus according to claim 1, wherein
the plurality of storage media configure a RAID, the access unit writes the unformatted identifier into the storage area of a number of storage media larger by 1 than a number of redundancy that is a number of restorable storage media, at formatting, and a management information storage unit stores a management information that shows a logical format is completed about all storage areas of the stripe in which the unformatted identifier is written.

8. The storage apparatus according to claim 4, wherein
the storage apparatus has a flag storage part for storing a flag that shows writing the format data in all stripes of the plurality of storage media is stored, and when writing the format data is completed, the access unit sets the flag to all stripes of the storage media.

9. A computer-readable, non-transitory medium storing a program causing a computer to function as an access unit to execute a procedure, the procedure comprising:
writing an unformatted-state identifier indicating incompletion of formatting into at least a portion of storage area to be included in a stripe among the plurality of storage media;
reading out existing data stored in the storage area included in the stripe to be accessed; and
writing a new data or a format data to be written by formatting into the storage area included in the stripe, when the unformatted-state identifier is detected from the existing data that has been read out.

10. A storage apparatus control method comprising:
writing an unformatted-state identifier indicating incompletion of formatting into at least a portion of storage area in the plurality of storage medias, the storage area being included in a stripe;
reading out existing data stored in the storage area included in the stripe that is an access target; and
writing a new data or a format data to be written by formatting into the storage area included in the stripe, when the unformatted-state identifier is detected from the existing data that has been read out.

* * * * *